United States Patent
Rothman et al.

(10) Patent No.: US 9,981,271 B2
(45) Date of Patent: May 29, 2018

(54) METHOD AND SYSTEM FOR RELEASING MINERAL FROM SYNTHETIC BUBBLES AND BEADS

(75) Inventors: Paul J. Rothman, Windsor, CT (US); Mark R. Fernald, Enfield, CT (US); Francis K. Didden, Wallingford, CT (US); Christian V. O'keefe, Durham, CT (US); Douglas H. Adamson, Mansfield Center, CT (US)

(73) Assignee: CiDRA CORPORATE SERVICES LLC, Wallingford, CT (US)

( * ) Notice: Subject to any disclaimer, the term of this patent is extended or adjusted under 35 U.S.C. 154(b) by 533 days.

(21) Appl. No.: 14/117,912

(22) PCT Filed: May 25, 2012

(86) PCT No.: PCT/US2012/039591
§ 371 (c)(1),
(2), (4) Date: Feb. 3, 2014

(87) PCT Pub. No.: WO2012/162612
PCT Pub. Date: Nov. 29, 2012

(65) Prior Publication Data
US 2014/0197077 A1 Jul. 17, 2014

Related U.S. Application Data

(60) Provisional application No. 61/489,893, filed on May 25, 2011, provisional application No. 61/533,544, filed on Sep. 12, 2011.

(51) Int. Cl.
*B03D 1/14* (2006.01)
*B03D 1/02* (2006.01)
(Continued)

(52) U.S. Cl.
CPC .......... *B03C 5/00* (2013.01); *B01D 15/02* (2013.01); *B01D 37/02* (2013.01); *B01D 39/00* (2013.01);
(Continued)

(58) Field of Classification Search
None
See application file for complete search history.

(56) References Cited

U.S. PATENT DOCUMENTS

| | | | |
|---|---|---|---|
| 1,684,536 A | 9/1928 | Fischer |
| 2,585,473 A | 2/1952 | Kennedy |

(Continued)

FOREIGN PATENT DOCUMENTS

| | | |
|---|---|---|
| CN | 1011778957 | 7/2010 |
| CN | 101970119 | 2/2011 |

(Continued)

OTHER PUBLICATIONS

Wyss et al. "A novel approach for the extraction of herbicides and pesicides from water using liquid-core microcapsules" by Wyss et al. Biotechnology and Engineering; Aug. 19, 2004; abstract, 3 pages.
(Continued)

*Primary Examiner* — Thomas M Lithgow
(74) *Attorney, Agent, or Firm* — Ware, Fressola, Maguire & Barber LLP

(57) ABSTRACT

A synthetic bead for use in mineral separation is described. The synthetic bead has a surface made of a synthetic material such as polymer and the synthetic material is functionalized with molecules having a functional group for attaching mineral particles to the surface in a separation process. The synthetic beads can be placed in flotation cell containing a mixture of water, valuable material and unwanted material or in a pipeline where the mixture is (Continued)

transported from one location to another. The enriched synthetic beads carrying the mineral particles are separated from the unwanted materials in the mixture. The mineral particles are then released from the synthetic beads by means of low pH treatment, ultrasonic agitation, thermal or electromagnetic treatment.

18 Claims, 16 Drawing Sheets

(51) Int. Cl.
| | |
|---|---|
| B03C 1/01 | (2006.01) |
| B03C 5/00 | (2006.01) |
| B04C 1/00 | (2006.01) |
| B07B 1/00 | (2006.01) |
| B03B 1/04 | (2006.01) |
| B01D 37/02 | (2006.01) |
| C02F 1/24 | (2006.01) |
| B01D 39/00 | (2006.01) |
| C22B 15/00 | (2006.01) |
| B01D 15/02 | (2006.01) |
| B03D 1/016 | (2006.01) |
| B03C 5/02 | (2006.01) |

(52) U.S. Cl.
CPC ............... *B03B 1/04* (2013.01); *B03C 1/01* (2013.01); *B03C 5/02* (2013.01); *B03D 1/016* (2013.01); *B03D 1/023* (2013.01); *B03D 1/14* (2013.01); *B04C 1/00* (2013.01); *B07B 1/00* (2013.01); *C02F 1/24* (2013.01); *C22B 15/0063* (2013.01); *Y10T 428/2982* (2015.01)

(56) References Cited

U.S. PATENT DOCUMENTS

| | | | |
|---|---|---|---|
| 2,588,976 | A | 3/1952 | Fuhrmeister, Jr. |
| 2,678,132 | A | 5/1954 | Beard, Jr. |
| 2,699,872 | A | 1/1955 | Kelsey |
| 3,224,582 | A | 12/1965 | Iannicelli |
| 3,796,308 | A | 3/1974 | McIlhinney et al. |
| 3,868,318 | A | 2/1975 | Clark et al. |
| 3,970,518 | A * | 7/1976 | Giaever ............... A61K 39/44 209/8 |
| 4,100,242 | A | 7/1978 | Leach |
| 4,177,253 | A | 12/1979 | Davies et al. |
| RE30,360 | E | 8/1980 | Shubert |
| 4,224,138 | A | 9/1980 | Kruyer |
| 4,235,562 | A | 11/1980 | Ribas |
| 4,236,995 | A | 12/1980 | Kruyer |
| 4,269,699 | A | 5/1981 | McCready et al. |
| 4,313,832 | A | 2/1982 | Shimizu et al. |
| 4,358,368 | A | 11/1982 | Hellsten et al. |
| 4,363,749 | A | 12/1982 | Weiss et al. |
| 4,391,608 | A | 7/1983 | Dondelewski |
| 4,412,843 | A | 11/1983 | Burgess et al. |
| 4,511,461 | A | 4/1985 | Kruyer |
| 4,532,032 | A | 7/1985 | Ng et al. |
| 4,537,599 | A | 8/1985 | Greenwald, Sr. |
| 4,556,482 | A | 12/1985 | Nagaraj |
| 4,657,666 | A | 4/1987 | Snook et al. |
| 4,685,963 | A | 8/1987 | Saville |
| 4,888,106 | A | 12/1989 | Lipp et al. |
| 4,956,077 | A | 9/1990 | Barwise |
| 4,971,685 | A | 11/1990 | Stanley et al. |
| 4,981,582 | A | 1/1991 | Yoon et al. |
| 5,161,694 | A | 11/1992 | Yoon et al. |
| 5,167,798 | A | 12/1992 | Yoon et al. |
| 5,192,423 | A | 3/1993 | Duczmal et al. |
| 5,256,298 | A | 10/1993 | Powell |
| 5,603,841 | A | 2/1997 | Kerr |
| 5,670,056 | A | 9/1997 | Yoon et al. |
| 5,965,117 | A | 10/1999 | Howard, Jr. et al. |
| 6,234,318 | B1 | 5/2001 | Breau et al. |
| 6,312,603 | B1 | 11/2001 | Nishizawa |
| 6,319,407 | B1 | 11/2001 | Maatta et al. |
| 6,799,682 | B1 | 10/2004 | Yoon |
| 6,871,743 | B2 | 3/2005 | Yoon |
| 6,890,431 | B1 | 5/2005 | Eades et al. |
| 7,264,728 | B2 | 9/2007 | Gibson et al. |
| 7,285,219 | B2 | 10/2007 | Kolesinski |
| 7,426,852 | B1 | 9/2008 | Rothman |
| 7,488,418 | B2 | 2/2009 | Miller |
| 7,641,863 | B2 | 1/2010 | Doktycz et al. |
| 7,686,960 | B2 * | 3/2010 | Cort .................. B03C 1/015 210/631 |
| 7,759,123 | B2 | 7/2010 | Call |
| 7,891,213 | B2 | 2/2011 | Bogdahn et al. |
| 8,007,754 | B2 | 8/2011 | Yoon et al. |
| 8,408,395 | B2 | 4/2013 | Domke |
| 8,475,662 | B2 | 7/2013 | Domke et al. |
| 9,302,270 | B2 | 4/2016 | Rothman |
| 9,566,613 | B2 | 2/2017 | Kodama et al. |
| 2001/0008617 | A1 | 7/2001 | Robles |
| 2003/0104359 | A1 | 6/2003 | Cuthbertson et al. |
| 2003/0225231 | A1 | 12/2003 | Hall |
| 2004/0000523 | A1 | 1/2004 | Rosenberg et al. |
| 2004/0173506 | A1 | 9/2004 | Doktycz et al. |
| 2005/0029195 | A1 | 2/2005 | Gibson et al. |
| 2005/0029204 | A1 | 2/2005 | Schwartzkopf |
| 2005/0051465 | A1 | 3/2005 | Khan et al. |
| 2005/0139551 | A1 | 6/2005 | Yoon |
| 2005/0155415 | A1 | 7/2005 | Kurowski et al. |
| 2005/0242000 | A1 | 11/2005 | Khan et al. |
| 2006/0113259 | A1 | 6/2006 | Brunone |
| 2006/0151397 | A1 | 7/2006 | Wright et al. |
| 2006/0226051 | A1 | 10/2006 | Navarrette et al. |
| 2006/0263516 | A1 | 11/2006 | Jones et al. |
| 2006/0283516 | A1 | 12/2006 | Nagaoka et al. |
| 2008/0139399 | A1 | 6/2008 | Fonnum et al. |
| 2008/0156702 | A1 | 7/2008 | Duyvesteyn |
| 2008/0290029 | A1 | 11/2008 | Croue et al. |
| 2009/0061226 | A1 | 3/2009 | Banin et al. |
| 2009/0139906 | A1 | 6/2009 | Kruyer |
| 2009/0173668 | A1 | 7/2009 | Duyvesteyn et al. |
| 2009/0206040 | A1 | 8/2009 | Berg et al. |
| 2009/0267275 | A1 | 10/2009 | Birken |
| 2009/0301972 | A1 | 12/2009 | Hines et al. |
| 2010/0059449 | A1 | 3/2010 | Grass et al. |
| 2010/0072110 | A1 | 3/2010 | Gradek |
| 2010/0108573 | A1 | 5/2010 | Ravishankar et al. |
| 2010/0200510 | A1 | 8/2010 | Domke et al. |
| 2010/0228056 | A1 | 9/2010 | Wang et al. |
| 2010/0279322 | A1 | 11/2010 | Tang et al. |
| 2010/0285606 | A1 | 11/2010 | Phillips et al. |
| 2010/0294725 | A1 | 11/2010 | Bush et al. |
| 2010/0300941 | A1 | 12/2010 | Domke et al. |
| 2011/0114566 | A1 | 5/2011 | McCaw et al. |
| 2011/0120919 | A1 | 5/2011 | Domke et al. |
| 2011/0120954 | A1 | 5/2011 | Domke |
| 2011/0127201 | A1 | 6/2011 | Domke et al. |
| 2011/0131873 | A1 | 6/2011 | Soane et al. |
| 2011/0174696 | A1 | 7/2011 | Young |
| 2012/0029120 | A1 | 2/2012 | Soane et al. |
| 2012/0076694 | A1 | 3/2012 | Morozov et al. |
| 2012/0091000 | A1 | 4/2012 | Taylor et al. |
| 2013/0140218 | A1 | 6/2013 | Dobby |

FOREIGN PATENT DOCUMENTS

| | | |
|---|---|---|
| EP | 0164237 | 12/1980 |
| EP | 0163480 A1 | 12/1985 |
| EP | 0348620 | 1/1990 |
| EP | 1184064 | 3/2002 |
| EP | 2313200 | 4/2011 |
| EP | 2714055 A1 | 4/2014 |
| GB | 1339337 | 12/1973 |
| KZ | 22494 | 5/2010 |
| RU | 2038155 | 6/1995 |
| RU | 2063813 | 7/1996 |
| RU | 2091141 | 9/1997 |

(56) References Cited

FOREIGN PATENT DOCUMENTS

| SU | 118472 | 1/1959 |
| --- | --- | --- |
| SU | 441314 | 8/1974 |
| SU | 1558473 | 4/1990 |
| WO | 8301397 | 4/1983 |
| WO | 8404701 | 12/1984 |
| WO | 8910202 A1 | 11/1989 |
| WO | 9211091 | 7/1992 |
| WO | 02066168 | 8/2002 |
| WO | 2004064997 | 8/2004 |
| WO | 2005066631 | 7/2005 |
| WO | 2007098115 | 8/2007 |
| WO | 2008055371 | 5/2008 |
| WO | 2009252362 | 4/2009 |
| WO | 2010007157 | 1/2010 |
| WO | 2010098786 S1 | 9/2010 |
| WO | 2011064757 A1 | 6/2011 |
| WO | 2011091522 | 8/2011 |
| WO | 2012028701 A2 | 3/2012 |

OTHER PUBLICATIONS

Krishna et al. "Synthesis of xanthate functionalized silica gel and its application for the preconcentration and separation of uranium (VI) from inorganic components." Journal of Radioanalytical and Nuclear Chemistry. vol. 266, No. 2 (2005) 251-257.

Brown et al. Magnetic Control over Liquid Surface Properties with Responsive Surfactants. Angew. Chem. Int. Ed. 51: 1-4, 2012 (retrieved on Apr. 6, 2013). Retrieved from the Internet. <URL: http://www.magneticmicrosphere.com/ckfinder/userfiles/files/Brown_magnetic_detergent_2012.pdf>. entire document.

"The process of separation of fine mineral particles by flotation with hydrophobic polymeric carrier" by Jorge Rubio et al, International Journal of Mineral Processing, vol. 37, No. 1-2, Jan. 1, 1993, pp. 109-122.

CN 101778957 English Language Abstract (1 page).

RU2091141 English Language Abstract (1 page).

SU441314 English Language translation (4 pages).

English Language Abstract of CN101970119 (1 page).

English language Abstract of SU118472 (2 pages).

English Language Abstract of RU2063813.

English Language Abstract of RU2038155.

English Language Abstract of SU1558473.

Nimittrakoolchai et al., Deposition of transparent, hydrophobic polydimethylsiloxane—nanocrystalline TiO2 hybrid films on glass substrate, Sep. 28, 2007, Songklanakarin, pp. 1, 2 and 6.

Application of polymer in concrete, Shiyun Zhong, et al., Chemical industry press, published on Aug. 31, 2003, p. 338.

Decision on Granting issued by the Russian Patent Office in counterpart Russian application 2013157534 dated Feb. 24, 2016 (8 pages).

English language translation of WO2012028701-google translation.

* cited by examiner

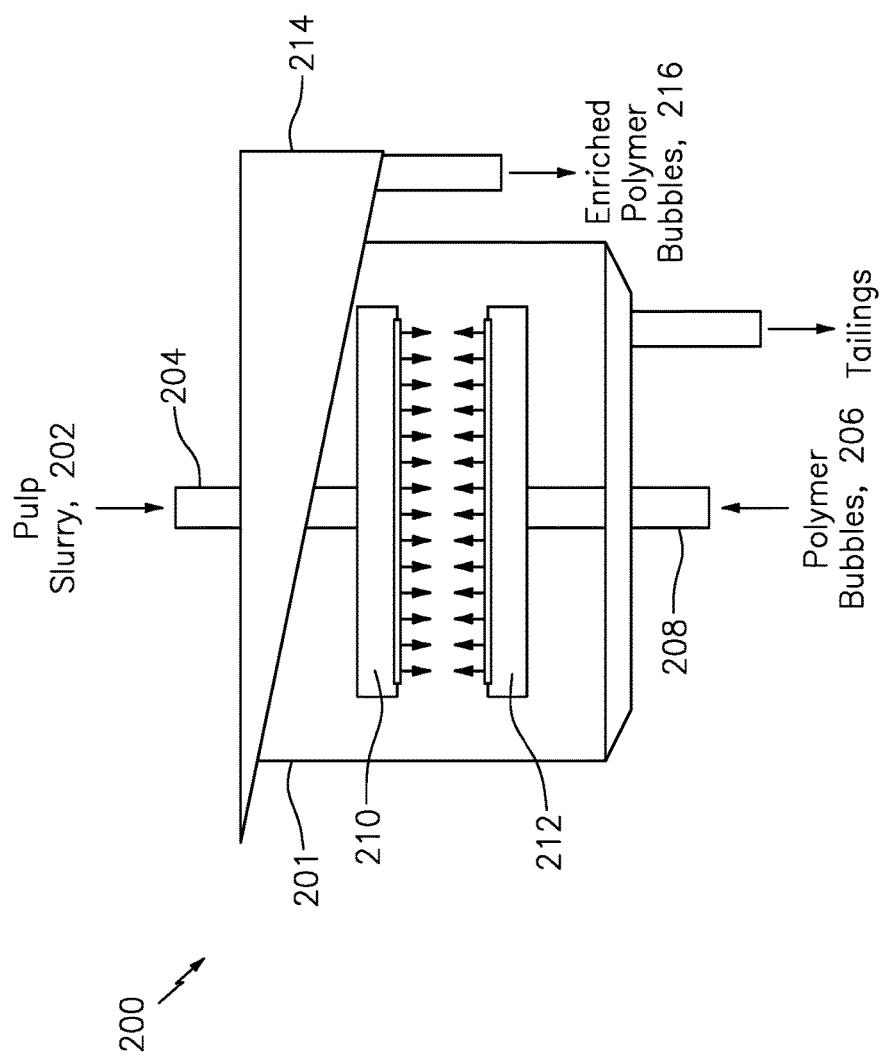
FIG. 2: Alternative Flotation Cell or Column

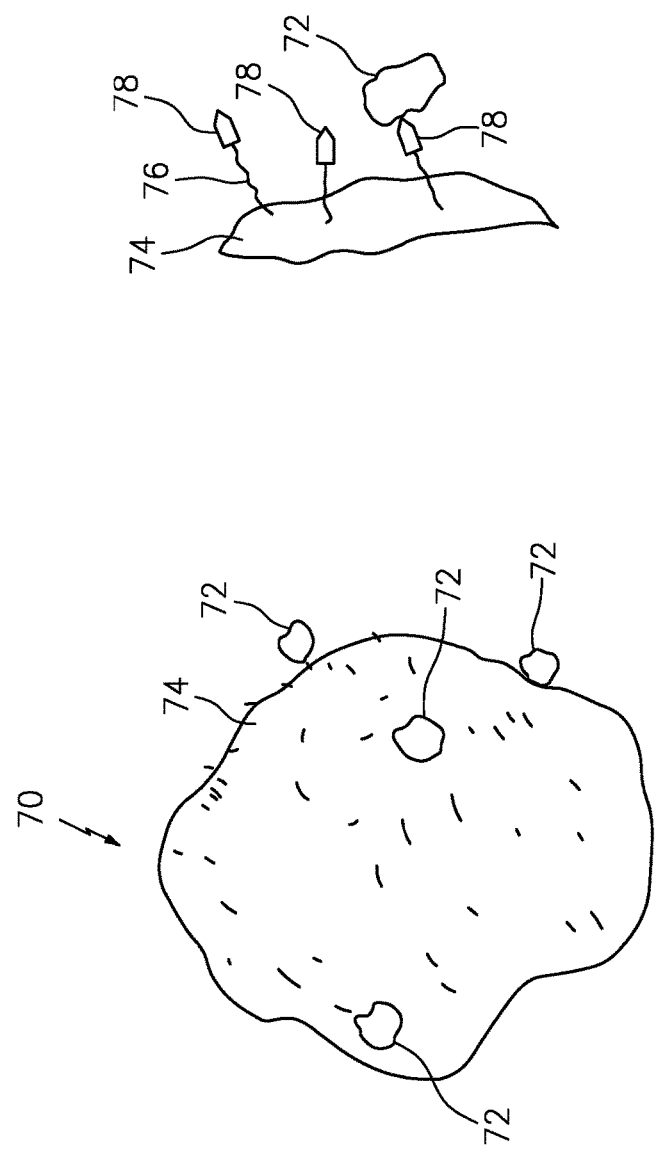

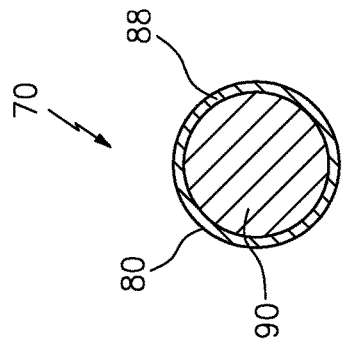
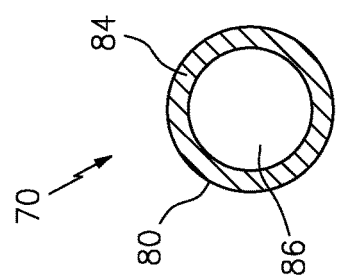
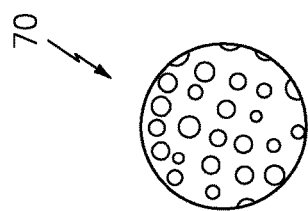
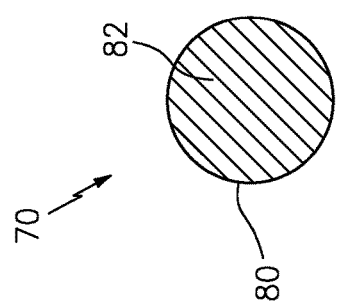

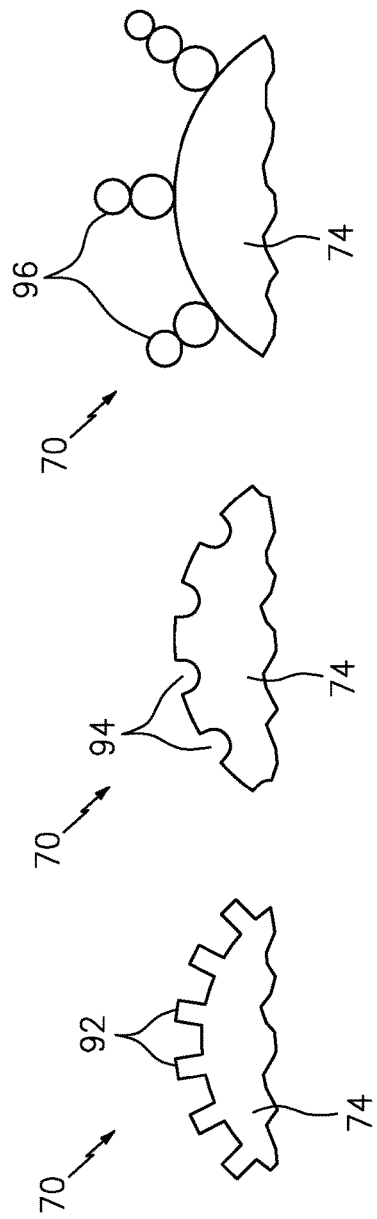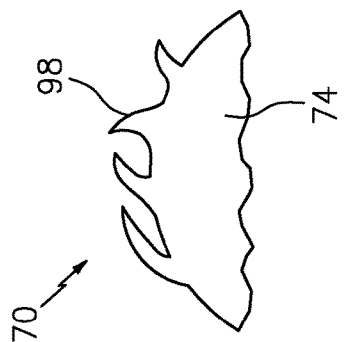
FIG. 5a  FIG. 5b  FIG. 5c  FIG. 5d

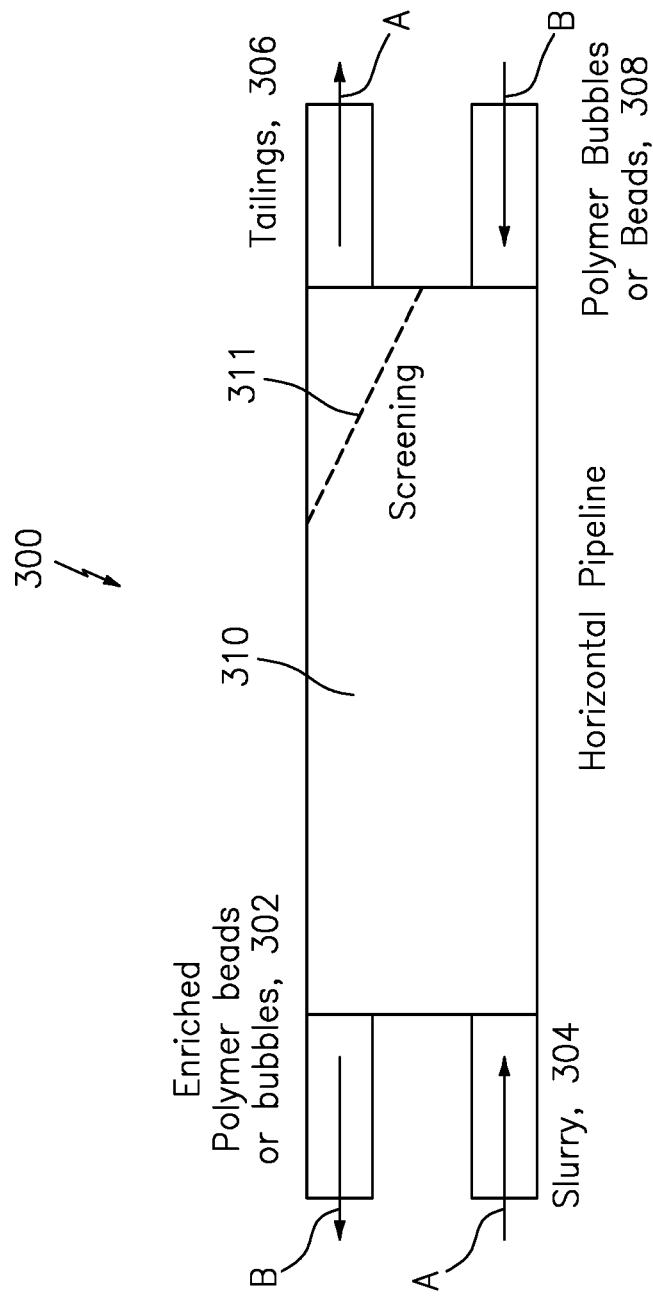
FIG. 12: Separation of Sized-Based Bubbles or Beads Using Countercurrent Flows with Mixing

METHOD AND SYSTEM FOR RELEASING MINERAL FROM SYNTHETIC BUBBLES AND BEADS

CROSS-REFERENCE TO RELATED APPLICATIONS

The present application corresponds to international patent application serial no. PCT/US2012/039591, filed 25 May 2012, which claims the benefit of U.S. Provisional Patent Application No. 61/489,893, filed 25 May 2011, and U.S. Provisional Patent Application No. 61/533,544, filed 12 Sep. 2011, which are both incorporated by reference in their entirety.

This application is also related to the following eight PCT applications, which are all concurrently filed on 25 May 2012, which all claim the benefit of the aforementioned U.S. Provisional Patent Application No. 61/489,893, filed 25 May 2011, and the aforementioned U.S. Provisional Patent Application No. 61/533,544, filed 12 Sep. 2011, and which are all incorporated by reference in their entirety so as to include the subject matter of each other, as follows:

PCT application no. PCT/US12/39528, entitled "Flotation separation using lightweight synthetic bubbles and beads;"

PCT application no. PCT/US12/39534, entitled "Mineral separation using functionalized membranes;"

PCT application no. PCT/US12/39540, entitled "Mineral separation using sized, weighted and magnetized beads;"

PCT application no. PCT/US12/39576, entitled "Synthetic bubbles/beads functionalized with molecules for attracting or attaching to mineral particles of interest;"

PCT application no. PCT/US/39596, entitled "Synthetic bubbles and beads having hydrophobic surface;"

PCT application no. PCT/US/39631, entitled "Mineral separation using functionalized filters and membranes;"

PCT application no. PCT/US12/39655, entitled "Mineral recovery in tailings using functionalized polymers;" and PCT application no. PCT/US12/39658, entitled "Techniques for transporting synthetic beads or bubbles In a flotation cell or column."

BACKGROUND OF THE INVENTION

1. Technical Field

This invention relates generally to a method and apparatus for separating valuable material from unwanted material in a mixture, such as a pulp slurry.

2. Description of Related Art

In many industrial processes, flotation is used to separate valuable or desired material from unwanted material. By way of example, in this process a mixture of water, valuable material, unwanted material, chemicals and air is placed into a flotation cell. The chemicals are used to make the desired material hydrophobic and the air is used to carry the material to the surface of the flotation cell. When the hydrophobic material and the air bubbles collide they become attached to each other. The bubble rises to the surface carrying the desired material with it.

The performance of the flotation cell is dependent on the air bubble surface area flux and air bubble size distribution in the collection zone of the cell. The air bubble surface area flux is dependent on the size of the bubbles and the air injection rate. Controlling the air bubble surface area flux has traditionally been very difficult. This is a multivariable control problem and there are no dependable real time feedback mechanisms to use for control.

There is a need in the industry to provide a better way to separate valuable material from unwanted material, e.g., including in such a flotation cell, so as to eliminate problems associated with using air bubbles in such a separation process.

SUMMARY OF THE INVENTION

The Method

According to some embodiments, the present invention may take the form of a method featuring steps for receiving in a processor a plurality of synthetic beads carrying mineral particles, each of the synthetic beads comprising a surface and a plurality of molecules attached to the surface, the molecules comprising a functional group having a chemical bond for attracting or attaching one or more of the mineral particles to the molecules, causing the mineral particles to attach to synthetic beads; and interrupting the chemical bond of the functional group so as to remove the mineral particles from the synthetic beads.

According to some embodiments of the present invention, the synthetic beads carrying the mineral particles may be received in a mixture having a first temperature, and the step of interrupting may include causing the synthetic beads carrying the mineral particles to contact with a medium having a second temperature higher than the first temperature.

According to some embodiments of the present invention, the synthetic beads carrying the mineral particles may be caused to contact with a liquid, and the step of interrupting may include applying a sonic agitation to the liquid for causing the mineral particles to separate from the synthetic beads, or the step of interrupting may include applying microwaves to the liquid for causing the mineral particles to separate from the synthetic beads. The step for interrupting may include providing an ultrasonic source to apply the sonic agitation to the liquid, and/or arranging the ultrasonic source to produce ultrasound signals for sonic agitation, for example ultrasound signals in the range of 20 KHz to 300 HKz for the sonic agitation. The step of interrupting may include providing an ultrasonic signal selected at the resonant frequency of the beads for causing the mineral particles to separate from the synthetic beads.

According to some embodiments of the present invention, the synthetic beads carrying the mineral particles may be received along with a mixture having a first pH value, and the step for interrupting may include causing the synthetic beads carrying the mineral particles to contact with a medium having a second pH value lower than the first pH value, including where the second pH value ranges from 0 to 7.

According to some embodiments of the present invention, the step of interrupting may include mechanically causing the synthetic beads to move against each other, including arranging a rotational means or device to stir the synthetic beads.

According to some embodiments of the present invention, the synthetic beads may be made of a polymer having a glass transition temperature, and the second temperature may be substantially equal to or higher than the glass transition temperature.

According to some embodiments of the present invention, part of the synthetic beads carrying the mineral particles may be made of a magnetic material, and the step of interrupting may include arranging a magnetic stirrer to stir the synthetic beads.

According to some embodiments of the present invention, the synthetic beads carrying the mineral particles may be received along with a mixture, wherein said interrupting comprises selecting two or more of the following interrupting techniques: 1) lowering pH value of the mixture, 2) applying an ultrasound to the mixture; 3) increasing temperature of the mixture and 4) mechanically stirring the mixture. The selected interrupting techniques may be used on the mixture concurrently or sequentially.

Apparatus

According to some embodiments, the present invention may take the form of an apparatus featuring a processor configured to receive a plurality of synthetic beads carrying mineral particles, each of the synthetic beads comprising a surface and a plurality of molecules attached to the surface, the molecules comprising a functional group having a chemical bond for attracting or attaching one or more of the mineral particles to the molecules, causing the mineral particles to attach to synthetic beads; and releasing apparatus configured to interrupt the chemical bond of the functional group so as to remove the mineral particles from the synthetic beads.

According to some embodiments, the present invention, the release apparatus may be configured to implement one or more of the features set forth herein.

According to some embodiments, the present invention may take the form of an apparatus featuring a processing compartment for receiving a plurality of synthetic beads carrying mineral particles, each of the synthetic beads comprising a surface and a plurality of molecules attached to the surface, the molecules comprising a functional group having a chemical bond for attracting or attaching one or more of the mineral particles to the molecules, causing the mineral particles to attach to synthetic beads; the synthetic beads carrying the mineral particles received in a mixture having a pH value; and a controller arranged to release an acidic material for lowering the pH value of the mixture.

According to some embodiments, the present invention may take the form of an apparatus featuring a processing compartment for receiving a plurality of synthetic beads carrying mineral particles, each of the synthetic beads comprising a surface and a plurality of molecules attached to the surface, the molecules comprising a functional group having a chemical bond for attracting or attaching one or more of the mineral particles to the molecules, causing the mineral particles to attach to synthetic beads; the synthetic beads carrying the mineral particles received in a mixture having a physical condition; and a sonic source arranged to apply ultrasonic waves to the mixture.

In effect, the present invention provides mineral separation techniques using synthetic beads or bubbles, including size-, weight-, density- and magnetic-based polymer bubbles or beads. The term "polymer" in the specification means a large molecule made of many units of the same or similar structure linked together.

The present invention may consist of replacing or assisting the air bubbles in a flotation cell that are presently used in the prior art with a similar density material that has very controllable size characteristics. By controlling the size and the injection rate a very accurate surface area flux can be achieved. This type of control would enable the bead or bubble size to be tuned or selected to the particle size of interest in order to better separate valuable or desired material from unwanted material in the mixture. Additionally, the buoyancy of the bubble or bead may be selected to provide a desired rate of rise within a flotation cell to optimize attraction and attachment to mineral particles of interest. By way of example, the material or medium could be a polymer or polymer-based bubble or bead. These polymer or polymer-based bubbles or beads are very inexpensive to manufacture and have a very low density. They behave very similar to a bubble, but do not pop.

Since this lifting medium size is not dependent on the chemicals in the flotation cell, the chemicals may be tailored to optimize hydrophobicity. There is no need to compromise the performance of the frother in order to generate the desired bubble size. A controlled size distribution of medium may be customized to maximize recovery of different feed matrixes to flotation as ore quality changes.

There may be a mixture of both air and lightweight beads or bubbles. The lightweight beads or bubbles may be used to lift the valuable material and the air may be used to create the desired froth layer in order to achieve the desired material grade.

Bead or bubble chemistry is also developed to maximize the attachment forces of the lightweight beads or bubbles and the valuable material.

A bead recovery process is also developed to enable the reuse of the lightweight beads or bubbles in a closed loop process. This process may consist of a washing station whereby the valuable mineral is mechanically, chemically, thermally or electromagnetically removed from the lightweight beads or bubbles. In particular, the removal process may be carried out by way of controlling the pH value of the medium in which the enriched polymer beads or bubbles are embedded, controlling the temperature of the medium, applying mechanical or sonic agitation to the medium, illuminating the enriched polymer beads with light of a certain range of frequencies, or applying electromagnetic waves on the enriched polymer beads in order to weaken or interrupting the bonds between the valuable material and the surface of the polymer beads or bubbles.

The Separation Process or Processor

According to some embodiments of the present invention, and by way of example, the separation process may utilize existing mining industry equipment, including traditional column cells and thickeners. The lightweight synthetic beads or bubbles, including polymer bubbles, may be injected into a first traditional column or cell at an injection air port and rise to the surface. This first traditional column or cell has an environment that is conducive to particle attachment. As the lightweight synthetic beads or bubbles rise they collide with the falling mineral particles. The falling mineral particles stick to the lightweight synthetic beads or bubbles and float or report to the surface. The wash water can be used to clean off the entrained gangue. The recovered bubbles and mineral may be sent to another traditional column or cell and injected into, e.g., the middle of the column. This traditional column or cell has an environment that will promote release of the mineral particles. The mineral particles fall to the bottom and the synthetic bubbles or beads float or go to the surface. The synthetic bubbles or beads may be reclaimed and then sent back through the process taking place in the first traditional column or cell. Thickeners may be used to reclaim the process water at both stages of the process.

Flotation Recovery of Coarse Ore Particles in Mining

According to some embodiments, the present invention may be used for flotation recovery of coarse ore particles in mining.

For example, the concept may take the form of the creation of the lightweight synthetic beads or bubbles in a flotation recovery for lifting particles, e.g., greater than 150 micron, to the surface in a flotation cell or column.

The fundamental notion is to create a shell or "semi-porous" structured bead or bubble of a predetermined size and use this as an 'engineered 'air bubble' for improving flotation recovery, e.g., of coarse ore particles in mining.

Flotation recovery may be implemented in multiple stages, e.g., where the first stage works well at recovering the ground ore at the right size (<150 microns), but ore particles that are too small or to large pass on to later stages and are more difficult to recover.

The present invention includes creating the "bubbles," and engineering them to carry the ore to the surface using, e.g., a polymer shell or structure, appropriately chemically activated to attract or attach to the ore.

Depending on the method of "engineering" the bubble, at or near the surface the shell could dissolve (time activated), and release an agent that further promotes the frothing.

Polymer Blocks Having Incorporated Air or Light-Weight Material

According to some embodiments, the present invention may take the form of synthetic flotation bubbles, using a concept such as incorporating air bubbles into polymer blocks, which are designed to attract or attach mineral rich ore onto their surface and then float to the top of the flotation tank. It is also possible to incorporate light-weight material such as Styrofoam into the polymer blocks to aid buoyancy.

The benefits of this approach include the fact that "engineered bubbles" in a polymer may enable a much larger range of ore grains to be lifted to the surface hence improving recover efficiency.

According to some embodiments, optimally sized polymer blocks with a high percentage of air may be produced with appropriate collector chemicals also encapsulated into the polymer.

Once the blocks are in, e.g., a mixture such as a slurry pulp, the collector chemicals may be released to initially attract or attach to mineral rich ore particles and then rise to the surface.

Example of Embodiments

Apparatus in the Form of a Cell or Column

According to some embodiments, the present invention may take the form of apparatus featuring a cell or column configured to receive a mixture of fluid (e.g. water) and valuable material and unwanted material; receive synthetic bubbles or beads constructed to be buoyant when submerged in the mixture and functionalized to control the chemistry of a process being performed in the cell or column; and provide enriched synthetic bubbles or beads having the valuable material attached thereto.

According to some embodiments of the present invention, the synthetic bubbles or beads may be made from a polymer or polymer-based material, or silica or silica-based material, or glass or glass-based material.

According to some embodiments of the present invention, the cell or column may take the form of a flotation cell or column, and the synthetic bubbles or beads may be functionalized to attach to the valuable material in the mixture that forms part of a flotation separation process being performed in the flotation cell or column.

According to some embodiments of the present invention, the synthetic bubbles or beads may be functionalized to release a chemical to control the chemistry of the flotation separation process.

According to some embodiments of the present invention, the synthetic bubbles or beads may be configured with firm outer shells functionalized with a chemical to attach to the valuable material in the mixture. Alternatively, the synthetic bubbles or beads may include a chemical that may be released to attach to the valuable material in the mixture.

According to some embodiments of the present invention, the synthetic bubbles or beads may be constructed with firm outer shells configured to contain a gas, including air, so as to increase be buoyant when submerged in the mixture. Alternatively, the synthetic bubbles or beads may be made from a low-density material so as to be buoyant when submerged in the mixture, including the synthetic bubbles being configured as a solid without an internal cavity.

According to some embodiments of the present invention, the synthetic bubbles or beads may include a multiplicity of hollow objects, bodies, elements or structures, each configured with a respective cavity, unfilled space, or hole to trap and maintain a bubble inside. The hollow objects, bodies, elements or structures may include hollow cylinders, or spheres, or globules, or capillary tubes, or some combination thereof. Each hollow object, body, element or structure may be configured with a dimension so as not to absorb liquid, including water, including where the dimension is in a range of about 20-30 microns. The multiplicity of hollow objects, bodies, elements or structures may be configured with chemicals applied to prevent migration of liquid into respective cavities, including where the chemicals are hydrophobic chemicals. The synthetic bubbles or beads made from the silica or silica-based material, or glass or glass-based material, may take the form of hollow glass cylinders manufactured using a drawing and dicing process.

The scope of the invention is not intended to be limited to the size or shape of the synthetic beads or bubbles, so as to enhance their rise or fall in the mixture.

The scope of the invention is also intended to include other types or kinds of ways to construct and functionalize the synthetic bubbles or beads either now known or later developed in the future in order to perform the aforementioned functionality of being buoyant when submerged in the mixture and to attach to the valuable material in the mixture.

According to some embodiments of the present invention, the mixture may take the form of a slurry pulp containing, e.g., water and the valuable material of interest.

A Method for Implementing in a Flotation Separation Device

The present invention may also take the form of a method, e.g., for implementing in a flotation separation device having a flotation cell or column. The method may include steps for receiving in the flotation cell or column a mixture of fluid and valuable material; receiving in the flotation cell or column synthetic bubbles or beads constructed to be buoyant when submerged in the mixture and functionalized to attach to the valuable material in the mixture and; and providing from the flotation cell or column enriched synthetic bubbles or beads having the valuable material attached thereto.

According to some embodiments of the present invention, the method may include being implemented consistent with one or more of the features set forth herein.

Apparatus in the Form of a Flotation Separation Device

According to some embodiments, the present invention may take the form of apparatus such as a flotation separation device, including a flotation cell or column configured to receive a mixture of water, valuable material and unwanted material; receive polymer or polymer-based materials, including polymer or polymer bubbles or beads, configured to attach to the valuable material in the mixture; and provide enriched polymer or polymer-based materials, including enriched polymer or polymer-based bubbles or beads, having the valuable material attached thereon. According to some embodiments, the polymer or polymer-based material may be configured with a surface area flux by controlling some combination of the size of the polymer or polymer-based material and/or the injection rate that the mixture is received in the flotation cell or column; or the polymer or polymer-based material may be configured with a low density so as to behave like air bubbles; or the polymer or polymer-based material may be configured with a controlled size distribution of medium that may be customized to maximize recovery of different feed matrixes to flotation as valuable material quality changes, including as ore quality changes; or some combination thereof.

The present invention may take the form of apparatus for use in, or forming part of, a separation process to be implemented in separation processor technology, the apparatus featuring synthetic bubbles or beads configured with a polymer or polymer-based material functionalized to attach to a valuable material in a mixture so as to form an enriched synthetic bubbles or beads having the valuable material attached thereto, and also configured to be separated from the mixture based at least partly on a difference in a physical property between the enriched synthetic bubbles or beads having the valuable material attached thereto and the mixture.

The separation process may be implemented in separation processor technology which combines the synthetic bubbles or beads and the mixture, and which provides the enriched synthetic bubbles or beads having the valuable material attached thereto that are separated from the mixture based at least partly on the difference in the physical property between the enriched synthetic bubbles or beads having the valuable material attached thereto and the mixture.

Size-Based Separation

The separation process may be implemented using sized-based separation, where the synthetic bubbles or beads may be configured to be separated from the mixture based at least partly on the difference between the size of the enriched synthetic bubbles or beads having the valuable material attached thereto in relation to the size of unwanted material in the mixture.

According to some embodiments of the present invention, the synthetic bubbles or beads may be configured either so that the size of the synthetic bubbles or beads is greater than a maximum ground ore particle size in the mixture, or so that the size of the synthetic bubbles or beads is less than a minimum ground ore particle size in the mixture.

According to some embodiments of the present invention, the synthetic bubbles or beads may be configured as solid polymer bubbles or beads.

According to some embodiments of the present invention, the synthetic bubbles or beads may be configured with a core material of sand, silica or other suitable material and also configured with a polymer encapsulation.

Weight-Based Separation

The separation process may be implemented using weight-based separation, where the synthetic bubbles or beads are configured to be separated from the mixture based at least partly on the difference between the weight of the enriched synthetic bubbles or beads having the valuable material attached thereto in relation to the weight of unwanted material in the mixture.

According to some embodiments of the present invention, the synthetic bubbles or beads may be configured so that the weight of the synthetic bubbles or beads is greater than a maximum ground ore particle weight in the mixture, or so that the weight of the synthetic bubbles or beads is less than a minimum ground ore particle weight in the mixture.

According to some embodiments of the present invention, the synthetic bubbles or beads may be configured as solid polymer bubbles or beads.

According to some embodiments of the present invention, the synthetic bubbles or beads may be configured with a core material of magnetite, air or other suitable material and also configured with a polymer encapsulation.

Magnetic-Based Separation

The separation process may be implemented using magnetic-based separation, where the synthetic bubbles or beads may be configured to be separated from the mixture based at least partly on the difference between the para-, ferri-, ferro-magnetism of the enriched synthetic bubbles or beads having the valuable material attached thereto in relation to the para-, ferri, ferro-magnetism of unwanted material in the mixture.

According to some embodiments of the present invention, the synthetic bubbles or beads may be configured so that the para-, ferri-, ferro-magnetism of the synthetic bubbles or beads is greater than the para-, ferri-, ferro-magnetism of the unwanted ground ore particle in the mixture.

According to some embodiments of the present invention, the synthetic bubbles or beads may be configured with a ferro-magnetic or ferri-magnetic core that attract to para-magnetic surfaces and also configured with a polymer encapsulation.

Density-Based Separation

The separation process may be implemented using density-based separation, where the synthetic bubbles or beads may be configured to be separated from the mixture based at least partly on the difference between the density of the enriched synthetic bubbles or beads having the valuable material attached thereto and the density of the mixture, consistent with that disclosed in PCT application no. PCT/US12/39528, entitled "Flotation separation using lightweight synthetic bubbles and beads;" filed 25 May 2012, which is hereby incorporated by reference in its entirety.

BRIEF DESCRIPTION OF THE DRAWING

Referring now to the drawing, which are not necessarily drawn to scale, the foregoing and other features and advantages of the present invention will be more fully understood from the following detailed description of illustrative embodiments, taken in conjunction with the accompanying drawing in which like elements are numbered alike:

FIG. 2 is a diagram of a flotation cell or column that may be used in place of the flotation cell or column that forms part of the flotation system, process or apparatus shown in FIG. 1 according to some embodiments of the present invention.

FIG. 3a shows a generalized synthetic bead which can be a size-based bead or bubble, weight-based polymer bead and bubble, and magnetic-based bead and bubble, according to some embodiments of the present invention.

FIG. 3b illustrates an enlarged portion of the synthetic bead showing a molecule or molecular segment for attaching a function group to the surface of the synthetic bead, according to some embodiments of the present invention.

FIG. 4a illustrates a synthetic bead having a body made of a synthetic material, according to some embodiments of the present invention.

FIG. 4b illustrates a synthetic bead with a synthetic shell, according to some embodiments of the present invention.

FIG. 4c illustrates a synthetic bead with a synthetic coating, according to some embodiments of the present invention.

FIG. 4d illustrates a synthetic bead taking the form of a porous block, a sponge or a foam, according to some embodiments of the present invention.

FIG. 5a illustrates the surface of a synthetic bead with grooves and/or rods, according to some embodiments of the present invention.

FIG. 5b illustrates the surface of a synthetic bead with dents and/or holes, according to some embodiments of the present invention.

FIG. 5c illustrates the surface of a synthetic bead with stacked beads, according to some embodiments of the present invention.

FIG. 5d illustrates the surface of a synthetic bead with hair-like physical structures, according to some embodiments of the present invention.

FIG. 12 is a diagram of an apparatus using counter-current flow for mineral separation, according to some embodiments of the present invention.

DETAILED DESCRIPTION OF THE INVENTION

FIG. 1

Figure 1:
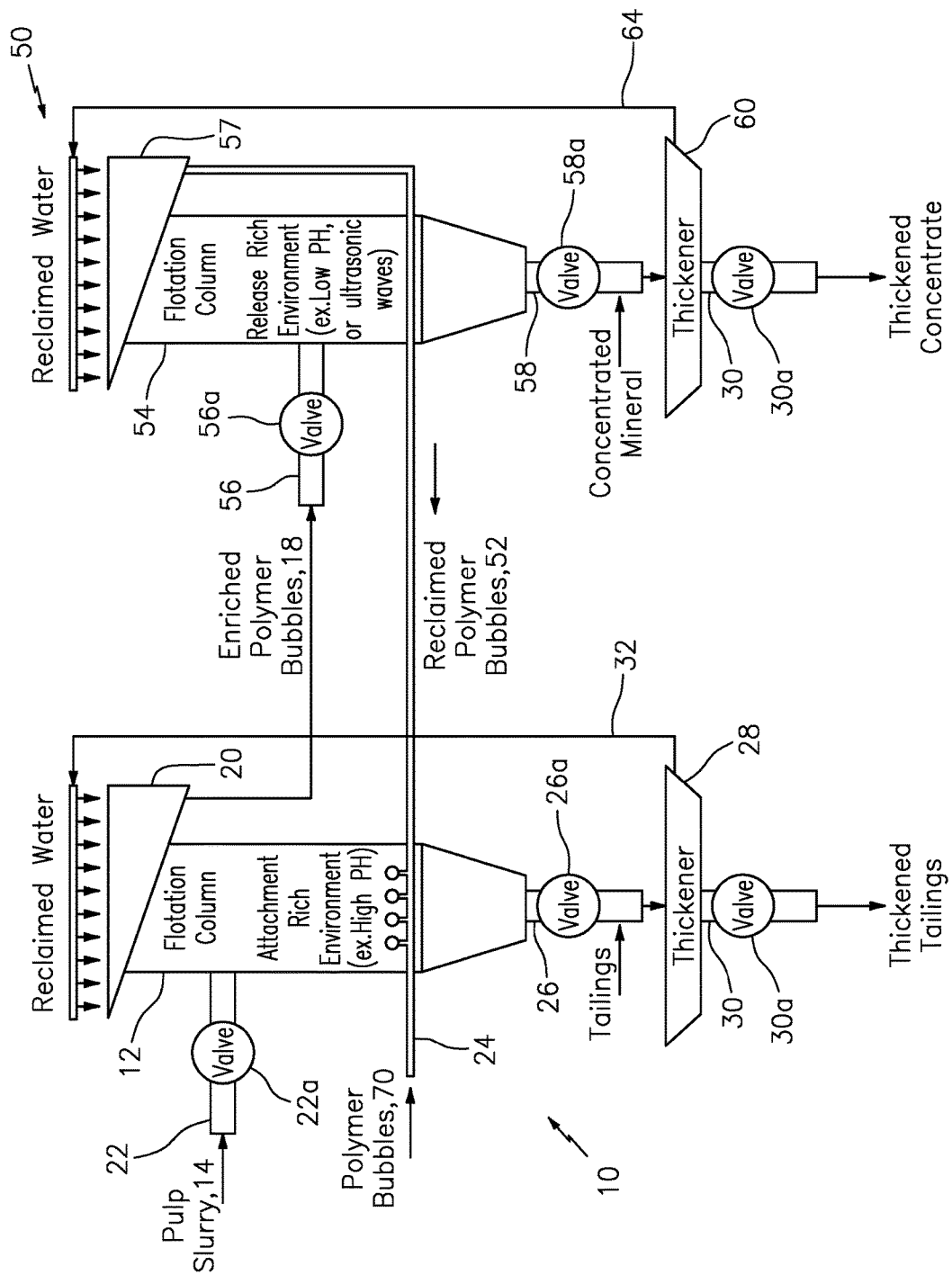
FIG. 1 is a diagram of a flotation system, process or apparatus according to some embodiments of the present invention.

By way of example, FIG. 1 shows the present invention is the form of apparatus 10, having a flotation cell or column 12 configured to receive a mixture of fluid (e.g. water), valuable material and unwanted material, e.g., a pulp slurry 14; receive synthetic bubbles or beads 70 (FIG. 3a to FIG. 5d) that are constructed to be buoyant when submerged in the pulp slurry or mixture 14 and functionalized to control the chemistry of a process being performed in the flotation cell or column, including to attach to the valuable material in the pulp slurry or mixture 14; and provide enriched synthetic bubble or beads 18 having the valuable material attached thereon. The terms "synthetic bubbles or beads" and "polymer bubbles or beads" are used interchangeably in this disclosure. The terms "valuable material", "valuable mineral" and "mineral particle" are also used interchangeably. By way of example, the synthetic bubbles or beads 70 may be made from polymer or polymer-based materials, or silica or silica-based materials, or glass or glass-based materials, although the scope of the invention is intended to include other types or kinds of material either now known or later developed in the future. For the purpose of describing one example of the present invention, in FIG. 1 the synthetic bubbles or beads 70 and the enriched synthetic bubble or beads 18 are shown as enriched polymer or polymer-based bubbles labeled 18. The flotation cell or column 12 is configured with a top portion or piping 20 to provide the enriched polymer or polymer-based bubbles 18 from the flotation cell or column 12 for further processing consistent with that set forth herein.

The flotation cell or column 12 may be configured with a top part or piping 22, e.g., having a valve 22*a*, to receive the pulp slurry or mixture 14 and also with a bottom part or piping 24 to receive the synthetic bubbles or beads 70. In operation, the buoyancy of the synthetic bubbles or beads 70 causes them to float upwardly from the bottom to the top of the flotation cell or column 12 through the pulp slurry or mixture 14 in the flotation cell or column 12 so as to collide with the water, valuable material and unwanted material in the pulp slurry or mixture 14. The functionalization of the synthetic bubbles or beads 70 causes them to attach to the valuable material in the pulp slurry or mixture 14. As used herein, the term "functionalization" means that the properties of the material making up the synthetic bubbles or beads 70 are either selected (based upon material selection) or modified during manufacture and fabrication, to be "attracted" to the valuable material, so that a bond is formed between the synthetic bubbles or beads 70 and the valuable material, so that the valuable material is lifted through the cell or column 12 due to the buoyancy of the synthetic bubbles or beads 70. For example, the surface of synthetic bubbles or beads has functional groups for collecting the valuable material. Alternatively, the synthetic bubbles or beads are functionalized to be hydrophobic for attracting wetted mineral particles—those mineral particles having collector molecules attached thereto. As a result of the collision between the synthetic bubbles or beads 70 and the water, valuable material and unwanted material in the pulp slurry or mixture 14, and the attachment of the synthetic bubbles or beads 70 and the valuable material in the pulp slurry or mixture 14, the enriched polymer or polymer-based bubbles 18 having the valuable material attached thereto will float to the top of the flotation cell 12 and form part of the froth formed at the top of the flotation cell 12. The flotation cell 12 may include a top part or piping 20 configured to provide the enriched polymer or polymer-based bubbles 18 having the valuable material attached thereto, which may be further processed consistent with that set forth herein. In effect, the enriched polymer or polymer-based bubbles 18 may be taken off the top of the flotation cell 12 or may be drained off by the top part or piping 20.

The flotation cell or column 12 may be configured to contain an attachment rich environment, including where the attachment rich environment has a high pH, so as to encourage the flotation recovery process therein. The flotation recovery process may include the recovery of ore particles in mining, including copper. The scope of the invention is not intended to be limited to any particular type or kind of flotation recovery process either now known or later developed in the future. The scope of the invention is also not intended to be limited to any particular type or kind of mineral of interest that may form part of the flotation recovery process either now known or later developed in the future.

According to some embodiments of the present invention, the synthetic bubbles or beads 70 may be configured with a surface area flux by controlling some combination of the size of the polymer or polymer-based bubbles and/or the injection rate that the pulp slurry or mixture 14 is received in the flotation cell or column 12. The synthetic bubbles or beads 70 may also be configured with a low density so as to behave like air bubbles. The synthetic bubbles or beads 70 may also be configured with a controlled size distribution of medium that may be customized to maximize recovery of different feed matrixes to flotation as valuable material quality changes, including as ore quality changes.

According to some embodiments of the present invention, the flotation cell or column 12 may be configured to receive the synthetic bubbles or beads 70 together with air, where the air is used to create a desired froth layer in the mixture in the flotation cell or column 12 in order to achieve a desired grade of valuable material. The synthetic bubbles or beads 70 may be configured to lift the valuable material to the surface of the mixture in the flotation cell or column.

The Thickener 28

The apparatus 10 may also include piping 26 having a valve 26*a* for providing tailings to a thickener 28 configured to receive the tailings from the flotation cell or column 12. The thickener 28 includes piping 30 having a valve 30*a* to provide thickened tailings. The thickener 28 also includes suitable piping 32 for providing reclaimed water back to the flotation cell or column 12 for reuse in the process. Thickeners like element 28 are known in the art, and the scope of the invention is not intended to be limited to any particular type or kind either now known or later developed in the future.

The Bead Recovery Process or Processor 50

According to some embodiments of the present invention, the apparatus 10 may further comprises a bead recovery process or processor generally indicated as 50 configured to receive the enriched polymer or polymer-based bubbles 18 and provide reclaimed polymer or polymer-based bubbles 52 without the valuable material attached thereon so as to enable the reuse of the polymer or polymer-based bubbles 52 in a closed loop process. By way of example, the bead recovery process or processor 50 may take the form of a washing station whereby the valuable mineral is mechanically, chemically, or electro-statically removed from the polymer or polymer-based bubbles 18.

The bead recovery process or processor 50 may include a releasing apparatus in the form of a second flotation cell or column 54 having piping 56 with a valve 56*a* configured to receive the enriched polymer bubbles or beads 18; and substantially release the valuable material from the polymer bubbles or beads 18, and also having a top part or piping 57 configured to provide the reclaimed polymer bubbles or beads 52, substantially without the valuable material attached thereon The second flotation cell or column 54 may be configured to contain a release rich environment, including where the release rich environment has a low pH, or including where the release rich environment results from ultrasonic waves pulsed into the second flotation cell or column 54.

The bead recovery process or processor 50 may also include piping 58 having a valve 56*a* for providing concentrated minerals to a thickener 60 configured to receive the concentrated minerals from the flotation cell or column 54. The thickener 60 includes piping 62 having a valve 62*a* to provide thickened concentrate. The thickener 60 also includes suitable piping 64 for providing reclaimed water back to the second flotation cell or column 54 for reuse in the process. Thickeners like element 60 are known in the art, and the scope of the invention is not intended to be limited to any particular type or kind either now known or later developed in the future.

Embodiments are also envisioned in which the enriched synthetic beads or bubbles are placed in a chemical solution so the valuable material is dissolved off, or are sent to a smelter where the valuable material is burned off, including where the synthetic beads or bubbles are reused afterwards.

Dosage Control

According to some embodiments of the present invention, the synthetic beads or bubbles 70 may be functionalized to control the chemistry of the process being performed in the cell or column, e.g. to release a chemical to control the chemistry of the flotation separation process.

In particular, the flotation cell or column 12 in FIG. 1 may be configured to receive polymer-based blocks like synthetic beads containing one or more chemicals used in a flotation separation of the valuable material, including mining ores, that are encapsulated into polymers to provide a slow or targeted release of the chemical once released into the flotation cell or column 12. By way of example, the one or more chemicals may include chemical mixes both now known and later developed in the future, including typical frothers, collectors and other additives used in flotation separation. The scope of the invention is not intended to be limited to the type or kind of chemicals or chemical mixes that may be released into the flotation cell or column 12 using the synthetic bubbles according to the present invention.

The scope of the invention is intended to include other types or kinds of functionalization of the synthetic beads or bubbles in order to provide other types or kinds of control of the chemistry of the process being performed in the cell or column, including either functionalizations and controls both now known and later developed in the future. For example, the synthetic beads or bubbles may be functionalized to control the pH of the mixture that forms part of the flotation separation process being performed in the flotation cell or column.

FIG. 2: The Collision Technique

FIG. 2 shows alternative apparatus generally indicated as 200 in the form of an alternative flotation cell 201 that is based at least partly on a collision technique between the mixture and the synthetic bubbles or beads, according to some embodiments of the present invention. The mixture 202, e.g. the pulp slurry, may be received in a top part or piping 204, and the synthetic bubbles or beads 206 may be received in a bottom part or piping 208. The flotation cell 201 may be configured to include a first device 210 for receiving the mixture 202, and also may be configured to include a second device 212 for receiving the polymer-based materials. The first device 210 and the second device 212 are configured to face towards one another so as to provide the mixture 202 and the synthetic bubbles or beads 206, e.g., polymer or polymer-based materials, using the collision technique. In FIG. 2, the arrows 210a represent the mixture being sprayed, and the arrows 212a represent the synthetic bubbles or beads 206 being sprayed towards one another in the flotation cell 201.

In operation, the collision technique causes vortices and collisions using enough energy to increase the probability of touching of the polymer or polymer-based materials 206 and the valuable material in the mixture 202, but not too much energy to destroy bonds that form between the polymer or polymer-based materials 206 and the valuable material in the mixture 202. Pumps, not shown, may be used to provide the mixture 202 and the synthetic bubbles or beads 206 are the appropriate pressure in order to implement the collision technique.

By way of example, the first device 210 and the second device 212 may take the form of shower-head like devices having a perforated nozzle with a multiplicity of holes for spraying the mixture and the synthetic bubbles or beads towards one another. Shower-head like devices are known in the art, and the scope of the invention is not intended to be limited to any particular type or kind thereof either now known or later developed in the future. Moreover, based on that disclosed in the instant patent application, a person skilled in the art without undue experimentation would be able to determine the number and size of the holes for spraying the mixture 202 and the synthetic bubbles or beads 206 towards one another, as well as the appropriate pumping pressure in order to provide enough energy to increase the probability of touching of the polymer or polymer-based materials 206 and the valuable material in the mixture 202, but not too much energy to destroy bonds that form between the polymer or polymer-based materials 206 and the valuable material in the mixture 202.

As a result of the collision between the synthetic bubbles or beads 206 and the mixture, enriched synthetic bubbles or beads having the valuable material attached thereto will float to the top and form part of the froth in the flotation cell 201. The flotation cell 201 may include a top part or piping 214 configured to provide enriched synthetic bubbles or beads 216, e.g., enriched polymer bubbles as shown, having the valuable material attached thereto, which may be further processed consistent with that set forth herein.

The alternative apparatus 200 may be used in place of the flotation columns or cells, and inserted into the apparatus or system shown in FIG. 1, and may prove to be more efficient than using the flotation columns or cells.

FIGS. 3a-5d: The Synthetic Bubbles or Beads

The bubbles or beads used in mineral separation are referred herein as synthetic bubbles or beads. At least the surface of the synthetic bubbles or beads has a layer of polymer functionalized to attract or attach to the value material or mineral particles in the mixture. The term "polymer bubbles or beads", and the term "synthetic bubbles or beads" are used interchangeably. The term "polymer" in this specification means a large molecule made of many units of the same or similar structure linked together. The unit can be a monomer or an oligomer which forms the basis of, for example, polyamides (nylon), polyesters, polyurethanes, phenol-formaldehyde, urea-formaldehyde, melamine-formaldehyde, polyacetal, polyethylene, polyisobutylene, polyacrylonitrile, poly(vinyl chloride), polystyrene, poly(methyl methacrylates), poly(vinyl acetate), poly (vinylidene chloride), polyisoprene, polybutadiene, polyacrylates, poly(carbonate), phenolic resin, polydimethylsiloxane and other organic or inorganic polymers. The list is not necessarily exhaustive. Thus, the synthetic material can be hard or rigid like plastic or soft and flexible like an elastomer. While the physical properties of the synthetic beads can vary, the surface of the synthetic beads is chemically functionalized to provide a plurality of functional groups to attract or attach to mineral particles. (By way of example, the term "functional group" may be understood to be a group of atoms responsible for the characteristic reactions of a particular compound, including those define the structure of a family of compounds and determine its properties.)

For aiding a person of ordinary skill in the art in understanding various embodiments of the present invention, FIG. 3a shows a generalized synthetic bead and FIG. 3b shows an enlarged portion of the surface. The synthetic bead can be a size-based bead or bubble, weight-based polymer bead and bubble, and/or magnetic-based bead and bubble. As shown in FIGS. 3a and 3b, the synthetic bead 70 has a bead body to provide a bead surface 74. At least the outside part of the bead body is made of a synthetic material, such as polymer, so as to provide a plurality of molecules or molecular segments 76 on the surface 74. The molecule 76 is used to attach a chemical functional group 78 to the surface 74. In general, the molecule 76 can be a hydrocarbon chain, for example, and the functional group 78 can have an anionic bond for attracting or attaching a mineral, such as copper to the surface 74. A xanthate, for example, has both the functional group 78 and the molecular segment 76 to be incorporated into the polymer that is used to make the synthetic bead 70. A functional group 78 is also known as a collector that is either ionic or non-ionic. The ion can be anionic or cationic. An anion includes oxyhydryl, such as carboxylic, sulfates and sulfonates, and sulfhydral, such as xanthates and dithiophosphates. Other molecules or compounds that can be used to provide the function group 78 include, but are not limited to, thionocarboamates, thioureas, xanthogens, monothiophosphates, hydroquinones and polyamines. Similarly, a chelating agent can be incorporated into or onto the polymer as a collector site for attracting a mineral, such as copper. As shown in FIG. 3b, a mineral particle 72 is attached to the functional group 78 on a molecule 76. In general, the mineral particle 72 is much smaller than the synthetic bead 70. Many mineral particles 72 can be attracted to or attached to the surface 74 of a synthetic bead 70.

In some embodiments of the present invention, a synthetic bead has a solid-phase body made of a synthetic material, such as polymer. The polymer can be rigid or elastomeric. An elastomeric polymer can be polyisoprene or polybutadiene, for example. The synthetic bead 70 has a bead body 80 having a surface comprising a plurality of molecules with one or more functional groups for attracting mineral particles to the surface. A polymer having a functional group to collect mineral particles is referred to as a functionalized polymer. In one embodiment, the entire interior part 82 of the synthetic bead 80 is made of the same functionalized material, as shown in FIG. 4a. In another embodiment, the bead body 80 comprises a shell 84. The shell 84 can be formed by way of expansion, such as thermal expansion or pressure reduction. The shell 84 can be a micro-bubble or a balloon. In FIG. 4b, the shell 84, which is made of functionalized material, has an interior part 86. The interior part 86 can be filled with air or gas to aid buoyancy, for example. The interior part 86 can be used to contain a liquid to be released during the mineral separation process. The encapsulated liquid can be a polar liquid or a non-polar liquid, for example. The encapsulated liquid can contain a depressant composition for the enhanced separation of copper, nickel, zinc, lead in sulfide ores in the flotation stage, for example. The shell 84 can be used to encapsulate a powder which can have a magnetic property so as to cause the synthetic bead to be magnetic, for example. The encapsulated liquid or powder may contain monomers, oligomers or short polymer segments for wetting the surface of mineral particles when released from the beads. For example, each of the monomers or oligomers may contain one functional group for attaching to a mineral particle and an ion for attaching the wetted mineral particle to the synthetic bead. The shell 84 can be used to encapsulate a solid core, such as Styrofoam to aid buoyancy, for example. In yet another embodiment, only the coating of the bead body is made of functionalized polymer. As shown in FIG. 4c, the synthetic bead has a core 90 made of ceramic, glass or metal and only the surface of core 90 has a coating 88 made of functionalized polymer. The core 90 can be a hollow core or a filled core depending on the application. The core 90 can be a micro-bubble, a sphere or balloon. For example, a filled core made of metal makes the density of the synthetic bead to be higher than the density of the pulp slurry, for example. The core 90 can be made of a magnetic material so that the para-, ferri-, ferro-magnetism of the synthetic bead is greater than the para-, ferri-, ferro-magnetism of the unwanted ground ore particle in the mixture. In a different embodiment, the synthetic bead can be configured with a ferro-magnetic or ferri-magnetic core that attract to paramagnetic surfaces. A core 90 made of glass or ceramic can be used to make the density of the synthetic bead substantially equal to the density of the pulp slurry so that when the synthetic beads are mixed into the pulp slurry for mineral collection, the beads can be in a suspension state.

According to a different embodiment of the present invention, the synthetic bead 70 can be a porous block or take the form of a sponge or foam with multiple segregated gas filled chambers. The combination of air and the synthetic beads or bubbles 70 can be added to traditional naturally aspirated flotation cell.

It should be understood that the term "bead" does not limit the shape of the synthetic bead of the present invention to be spherical, as shown in FIG. 3. In some embodiments of the present invention, the synthetic bead 70 can have an elliptical shape, a cylindrical shape, a shape of a block. Furthermore, the synthetic bead can have an irregular shape.

It should also be understood that the surface of a synthetic bead, according to the present invention, is not limited to an overall smooth surface as shown in FIG. 3a. In some embodiments of the present invention, the surface can be irregular and rough. For example, the surface 74 can have some physical structures 92 like grooves or rods as shown in FIG. 5a. The surface 74 can have some physical structures 94 like holes or dents as shown in FIG. 5b. The surface 74 can have some physical structures 96 formed from stacked beads as shown in FIG. 5c. The surface 74 can have some hair-like physical structures 98 as shown in FIG. 5d. In addition to the functional groups on the synthetic beads that attract mineral particles to the bead surface, the physical structures can help trapping the mineral particles on the bead surface. The surface 74 can be configured to be a honeycomb surface or sponge-like surface for trapping the mineral particles and/or increasing the contacting surface.

It should also be noted that the synthetic beads of the present invention can be realized by a different way to achieve the same goal. Namely, it is possible to use a different means to attract the mineral particles to the surface of the synthetic beads. For example, the surface of the polymer beads, shells can be functionalized with a hydrophobic chemical molecule or compound. Alternatively, the surface of beads made of glass, ceramic and metal can be coated with hydrophobic chemical molecules or compounds. Using the coating of glass beads as an example, polysiloxanates can be used to functionalize the glass beads in order to make the synthetic beads. In the pulp slurry, xanthate and hydroxamate collectors can also be added therein for collecting the mineral particles and making the mineral particles hydrophobic. When the synthetic beads are used to collect the mineral particles in the pulp slurry having a pH value around 8-9, it is possible to release the mineral particles on the enriched synthetic beads from the surface of the synthetic beads in an acidic solution, such as a sulfuric acid solution. It is also possible to release the mineral particles carrying with the enriched synthetic beads by sonic agitation, such as ultrasonic waves.

The multiplicity of hollow objects, bodies, elements or structures may include hollow cylinders or spheres, as well as capillary tubes, or some combination thereof. The scope of the invention is not intended to be limited to the type, kind or geometric shape of the hollow object, body, element or structure or the uniformity of the mixture of the same. Each hollow object, body, element or structure may be configured with a dimension so as not to absorb liquid, including water, including where the dimension is in a range of about 20-30 microns. Each hollow object, body, element or structure may be made of glass or a glass-like material, as well as some other suitable material either now known or later developed in the future.

By way of example, the multiplicity of hollow objects, bodies, elements or structures that are received in the mixture may include a number in a range of multiple thousands of bubbles or beads per cubic foot of mixture, although the scope of the invention is not intended to be limited per se to the specific number of bubbles. For instance, a mixture of about three thousand cubic feet may include multiple millions of bubbles or beads, e.g., having a size of about 1 millimeter, in three thousand cubic feet of the mixture.

The multiplicity of hollow objects, bodies, elements or structures may be configured with chemicals applied to prevent migration of liquid into respective cavities, unfilled spaces or holes before the wet concrete mixture cures, including where the chemicals are hydrophobic chemicals.

The one or more bubbles may take the form of a small quantity of gas, including air, that is trapped or maintained in the cavities, unfilled spaces, or holes of the multiplicity of hollow objects, bodies, elements or structures.

The scope of the invention is intended to include the synthetic bubbles or beads shown herein being made from a polymer or polymer-based material, or a silica or silica-based, or a glass or glass-based material.

FIGS. 6-11: Releasing Mechanism

Various embodiments of the present invention are envisioned as examples to show that the valuable minerals can be mechanically, chemically, thermally, optically or electro-magnetically removed or released from the enriched synthetic beads or bubbles.

By way of example, the bead recovery process or processor 50 as shown in FIG. 1 can be adapted for the removal of valuable minerals from the enriched synthetic beads or bubbles in different ways. The releasing apparatus may include, or take the form of, a heater 150 (FIG. 6) configured to provide thermal heat for the removal of the valuable minerals from the enriched synthetic beads or bubbles; an ultrasonic wave producer 164 (FIG. 7) configured to provide an ultrasonic wave for the removal of valuable minerals from the enriched synthetic beads or bubbles, a container 168 (FIG. 8) configured to provide an acid or acidic solution 170 for the removal of the valuable minerals from the enriched synthetic beads or bubbles; a microwave source 172 (FIG. 9) configured to provide microwaves for the removal of the valuable minerals from the enriched synthetic beads or bubbles, a motor 186 and a stirrer 188 (FIG. 10) configured to stir the enriched synthetic beads or bubbles for the removal of the valuable minerals from the enriched synthetic beads or bubbles; and multiple release or recovery processors (FIG. 11) configured to use multiple release or recovery techniques for the removal of the valuable minerals from the enriched synthetic beads or bubbles. According to some embodiments of the present invention, the aforementioned releasing apparatus may be responsive to signalling, e.g., from a controller or control processor. In view of the aforementioned, and by way of example, the releasing techniques are set forth in detail below:

Thermally Releasing Valuable Material

Figure 6:
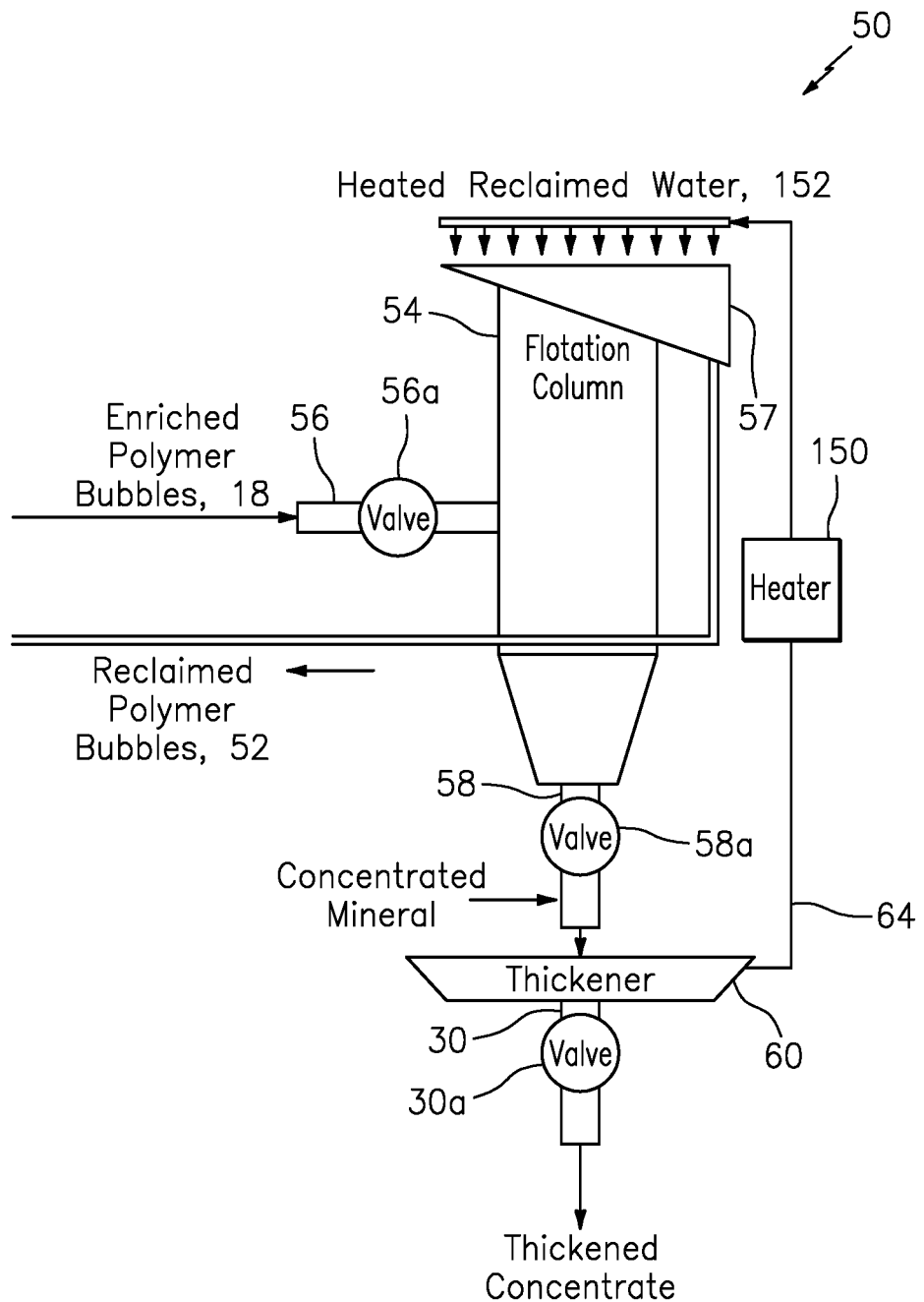
FIG. 6 is a diagram of a bead recovery processor in which the valuable material is thermally removed from the polymer bubbles or beads, according to some embodiments of the present invention.

The synthetic beads or bubbles 70, as shown in FIGS. 3a to 5c, can be made of a polymer which is softened when subjected to elevated temperature. It is known that a polymer may become rubbery above a certain temperature. This is due to the polymer-glass transition at a glass transition temperature, Tg. In general, the physical properties of a polymer are dependent on the size or length of the polymer chain. In polymers above a certain molecular weight, increasing chain length tends to increase the glass transition temperature Tg. This is a result of the increase in chain interactions such as Van der Waals attractions and entanglements that may come with increased chain length. A polymer such as polyvinyl chloride (PVC), has a glass transition temperature around 83 degrees Celsius. If the polymer bubbles or beads 70 have a hair-like surface structures 98 (see FIG. 5d) in order to trap the mineral particles 72 (see FIG. 3b), the hair-like surface structures 98 could become soft. Thus, in a certain polymer at the rubbery state, the hair-like surface structures 98 could lose the ability of holding the mineral particles. Since the separation process as shown in FIGS. 1 and 2 is likely to take place in room temperature or around 23 degrees Celsius. Any temperature, say, higher than 50 degrees Celsius, could soften the hair-like surface structures 98 (see FIG. 5d). For synthetic bubbles or beads 70 made of PVC, a temperature around or higher than 83 degrees Celsius can be used to dislodge the mineral particles from the surface structure of the synthetic bubbles or beads. According to one embodiment of the present invention, the bead recovery process or processor 50 as shown in FIG. 1 can be adapted for removing the mineral particles in the enriched polymer bubbles 18. For example, as the reclaimed water is moved out of the thickener 60 through piping 64, a heater 150 can be used to heat the reclaimed water as shown in FIG. 6. As such, the heated reclaimed water 152 can be arranged to wash the enriched polymer bubbles 18 inside the flotation column 54, thereby releasing at least some of the valuable material or mineral particles attached on the enriched polymer bubbles 18 to piping 58. It is possible to heat the reclaimed water to or beyond the glass transition temperature of the polymer that is used to make the polymer bubbles. The elevated temperature of the heated reclaimed water 152 could also weaken the bonds between the collectors 78 and the mineral particles 72 (see FIG. 3b). It is possible to use a heater to boil the water into steam and to apply the steam to the enriched polymer bubbles. It is also possible to generate superheated steam under a pressure and to apply the superheated steam to the enriched polymer bubbles.

Sonically Releasing Valuable Material

Figure 7:
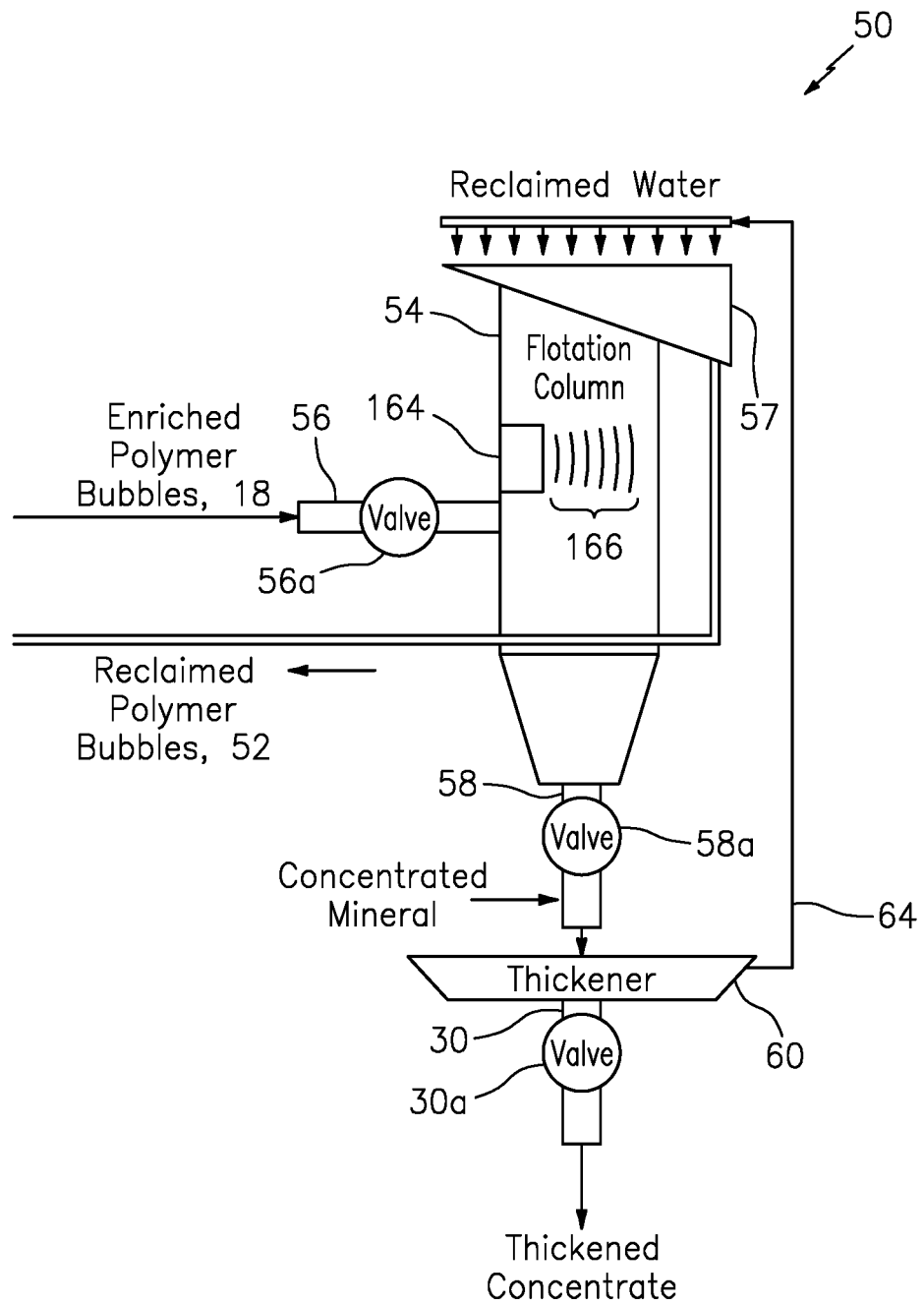
FIG. 7 is a diagram of a bead recovery processor in which the valuable material is sonically removed from the polymer bubbles or beads, according to some embodiments of the present invention.

When ultrasonic waves are applied in a solution or mixture containing the enriched polymer bubbles or beads, at least two possible effects could take place in interrupting the attachment of the valuable material to the surface of the polymer bubbles or beads. The sound waves could cause the attached mineral particles to move rapidly against the surface of the polymer bubbles or beads, thereby shaking the mineral particles loose from the surface. The sound waves could also cause a shape change to the synthetic bubbles, affecting the physical structures on the surface of the synthetic bubbles. It is known that ultrasound is a cyclic sound pressure with a frequency greater than the upper limit of human hearing. Thus, in general, ultrasound goes from just above 20 kilohertz (KHz) all the way up to about 300 KHz. In ultrasonic cleaners, low frequency ultrasonic cleaners have a tendency to remove larger particle sizes more effectively than higher operational frequencies. However, higher operational frequencies tend to produce a more penetrating scrubbing action and to remove particles of a smaller size more effectively. In mineral releasing applications involving mineral particles finer than 100 µm to 1 mm or larger, according to some embodiments of the present invention, the ultrasonic wave frequencies range from 10 Hz to 10 MHz. By way of example, the bead recovery process or processor 50 as shown in FIG. 1 can be adapted for removing the mineral particles in the enriched polymer bubbles 18 by applying ultrasound to the solution in the flotation column 54. For example, as the reclaimed water from piping 64 is used to wash the enriched polymer bubbles 18 inside the flotation column 54, it is possible to use an ultrasonic wave producer 164 to apply the ultrasound 166 in order to release the valuable material (mineral particles 72, FIG. 3b) from the enriched polymer bubbles 18. A diagram illustrating the ultrasonic application is shown in FIG. 7. According to some embodiments of the present application, an ultrasonic frequency that is the resonant frequency of the synthetic beads or bubbles is selected for mineral releasing applications.

Chemically Releasing Valuable Material

Figure 8:
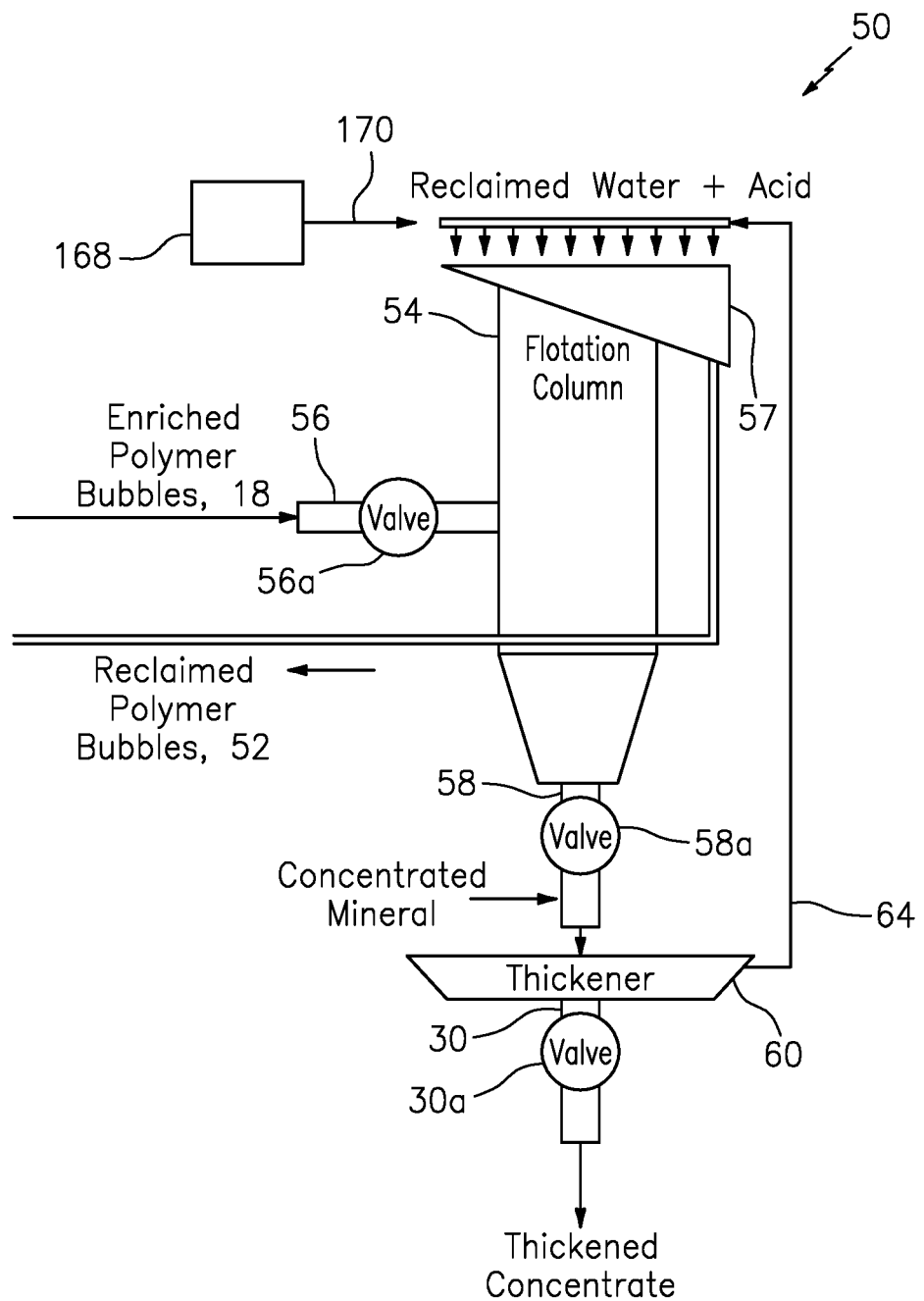
FIG. 8 is a diagram of a bead recovery processor in which the valuable material is chemically removed from the polymer bubbles or beads, according to some embodiments of the present invention.

In physisorption, the valuable minerals are reversibly associated with the synthetic bubbles or beads, attaching due to electrostatic attraction or van der Waals bonding. The physisorbed mineral particles can be desorbed or released from the surface of the synthetic bubbles or beads if the pH value of the solution changes. Furthermore, the surface chemistry of the most minerals is affected by the pH. Some minerals develop a positive surface charge under acidic conditions and a negative charge under alkaline conditions. The effect of pH changes is generally dependent on the collector and the mineral collected. For example, chalcopyrite becomes desorbed at a higher pH value than galena, and galena becomes desorbed at a higher pH value than pyrite. If the valuable mineral is collected at a pH of 8 to 11, it is possible to weaken the bonding between the valuable mineral and the surface of the polymer bubbles or beads by lower the pH to 7 and lower. However, an acidic solution having a pH value of 5 or lower would be more effective in releasing the valuable mineral from the enriched polymer bubbles or beads. According to one embodiment of the present invention, the bead recovery process or processor 50 as shown in FIG. 1 can be adapted for removing the mineral particles in the enriched polymer bubbles 18 by changing the pH of the solution in the flotation column 54. For example, as the reclaimed water from piping 64 is used to wash the enriched polymer bubbles 18 inside the flotation column 54, it is possible to use a container 168 to release an acid or acidic solution 170 into the reclaimed water as shown in FIG. 8. There are a number of acids easily available for changing the pH. For example, sulfuric acid (HCl), hydrochloric acid ($H_2SO_4$), nitric acid ($HNO_3$), perchloric acid ($HClO_4$), hydrobromic acid (HBr) and hydroiodic acid (HI) are among the strong acids that completely dissociate in water. However, sulfuric acid and hydrochloric acid can give the greater pH change at the lowest cost. The pH value used for mineral releasing ranges from 7 to 0. Using a very low pH may cause the polymer beads to degrade. It should be noted that, however, when the valuable material is copper, for example, it is possible to provide a lower pH environment for the attachment of mineral particles and to provide a higher pH environment for the releasing of the mineral particles from the synthetic beads or bubbles.

In general, the pH value is chosen to facilitate the strongest attachment, and a different pH value is chosen to facilitate release. Thus, according to some embodiments of the present invention, one pH value is chosen for mineral attachment, and a different pH value is chosen for mineral releasing. The different pH could be higher or lower, depending on the specific mineral and collector.

Electromagnetically Releasing Valuable Material

Figure 9:
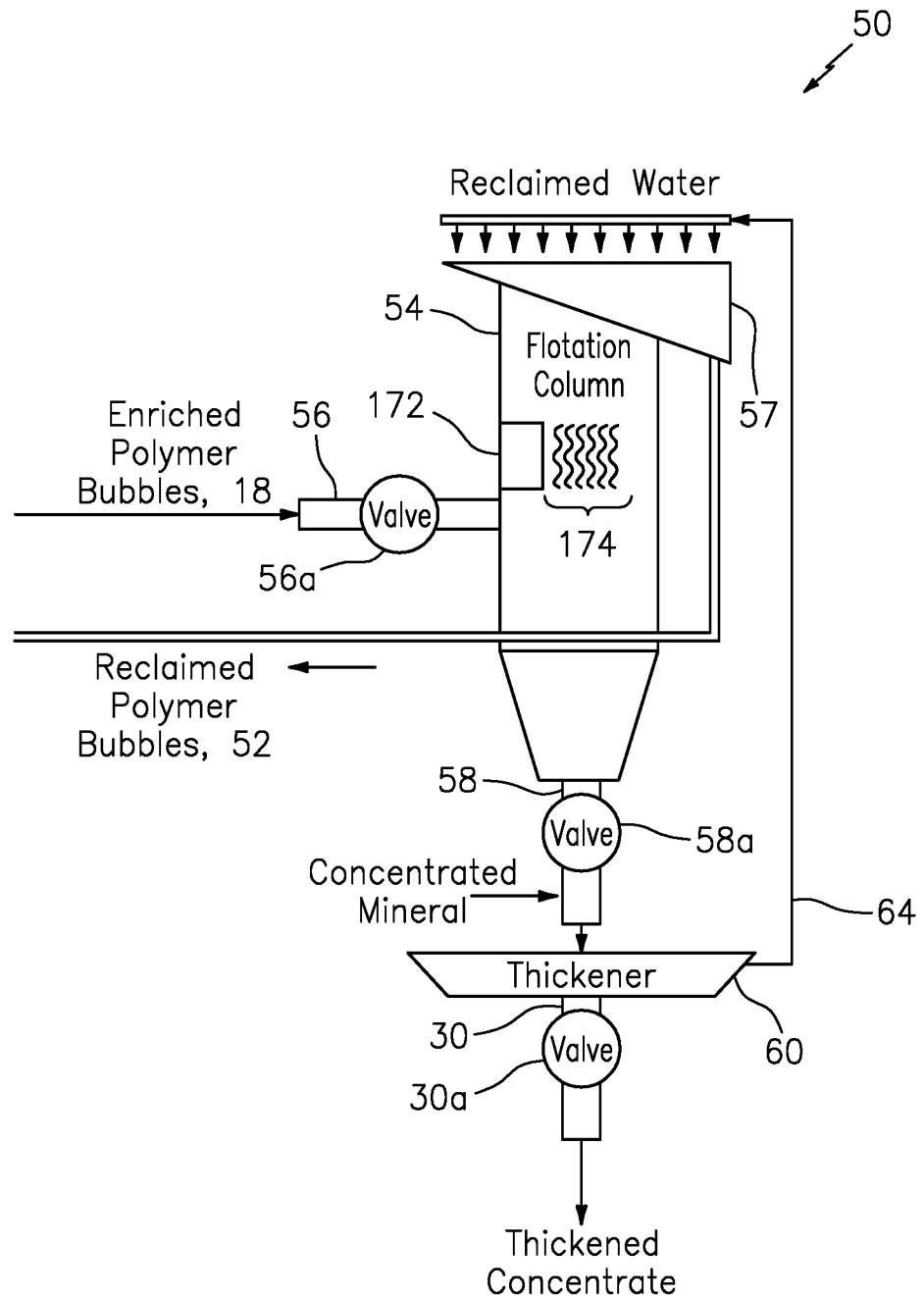
FIG. 9 is a diagram of a bead recovery processor in which the valuable material is electromagnetically removed from the polymer bubbles or beads, according to some embodiments of the present invention.

More than one way can be used to interrupt the bonding between the mineral particles and the synthetic bubbles or beads electromagnetically. For example, it is possible to use microwaves to heat up the enriched synthetic bubbles or beads and the water in the flotation column. It is also possible use a laser beam to weaken the bonds between the functional groups and the polymer surface itself. Thus, it is possible to provide a microwave source or a laser light source where the enriched synthetic bubbles or beads are processed. By way of example, the bead recovery process or processor 50 as shown in FIG. 1 can be adapted for removing the mineral particles in the enriched polymer bubbles 18 by using an electromagnetic source to provide electromagnetic waves to the solution or mixture in the flotation column 54. For example, as the reclaimed water from piping 64 is used to wash the enriched polymer bubbles 18 inside the flotation column 54, it is possible to use a microwave source 172 to apply the microwave beam 174 in order to release the valuable material (mineral particles 72, FIG. 3b) from the enriched polymer bubbles 18. A diagram illustrating the ultrasonic application is shown in FIG. 9.

Mechanically Releasing Valuable Material

Figure 10:
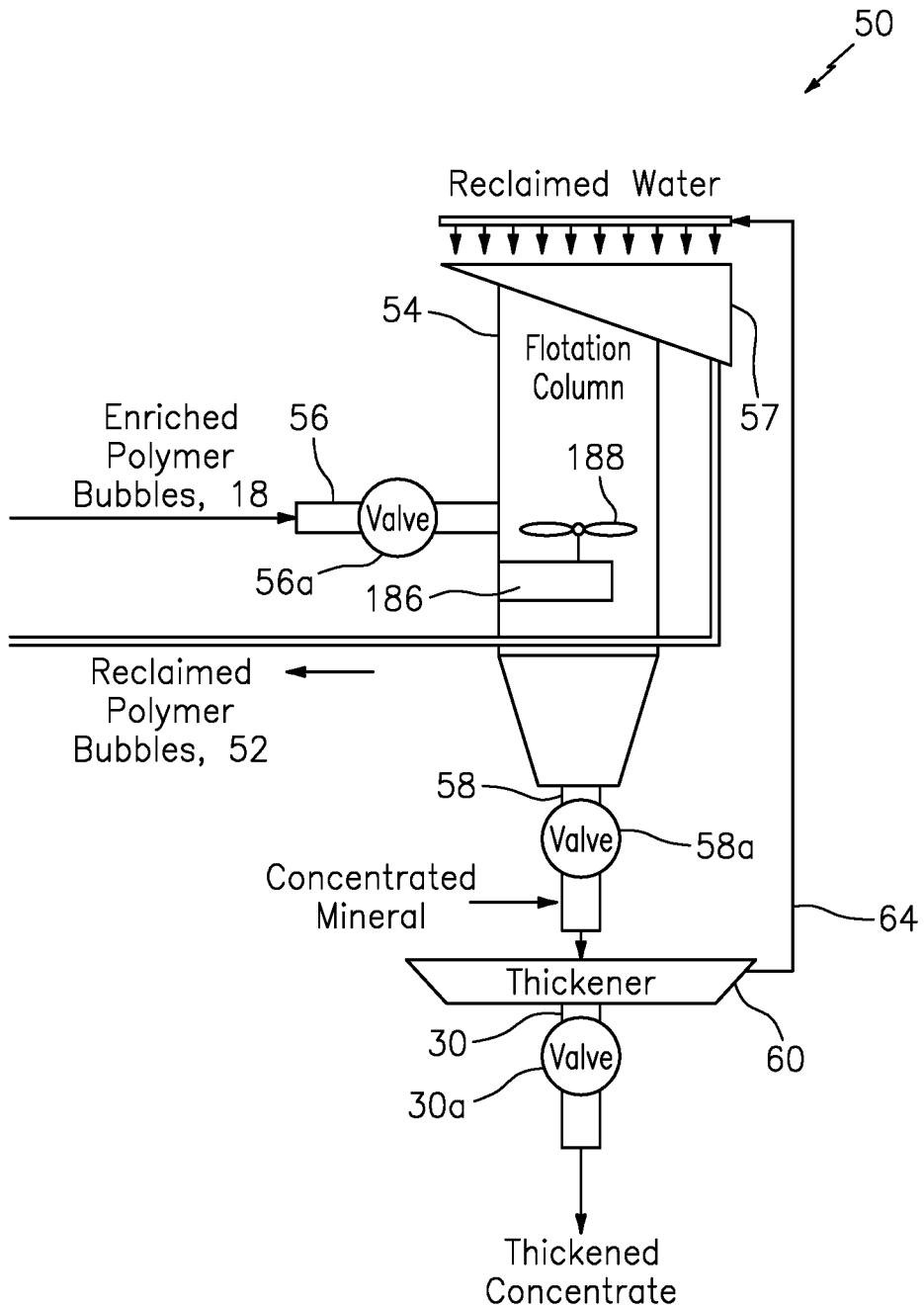
FIG. 10 is a diagram of a bead recovery processor in which the valuable material is mechanically removed from the polymer bubbles or beads, according to some embodiments of the present invention.

When the enriched synthetic bubbles or beads are densely packed such that they are in a close proximity to each other, the rubbing action among adjacent synthetic bubbles or beads may cause the mineral particles attached to the enriched synthetic bubbles or beads to be detached. By way of example, the bead recovery process or processor 50 as shown in FIG. 1 can be adapted for removing the mineral particles in the enriched polymer bubbles 18 mechanically. For example, a motor 186 and a stirrer 188 are used to move the enriched polymer bubbles around, causing the enriched polymer bubbles or beads 18 inside the flotation column 54 to rub against each other. If the synthetic bubbles or beads are magnetic, the stirrer 188 can be a magnetic stirrer. A diagram illustrating a mechanical release of valuable material is shown in FIG. 10.

Other Types or Kinds of Release Techniques

A heater like element 150 (FIG. 6), an ultrasonic wave producer like element 164 (FIG. 7), a container like element 168 (FIG. 8), a microwave source like element 172 (FIG. 9), a motor and stirrer like elements 186 188 (FIG. 10) are known in the art, and the scope of the invention is not intended to be limited to any particular type or kind thereof either now known or later developed in the future.

The scope of the invention is also intended to include other types or kinds of releasing apparatus consistent with the spirit of the present invention either now known or later developed in the future.

Multi-Stage Removal of Valuable Material

Figure 11:
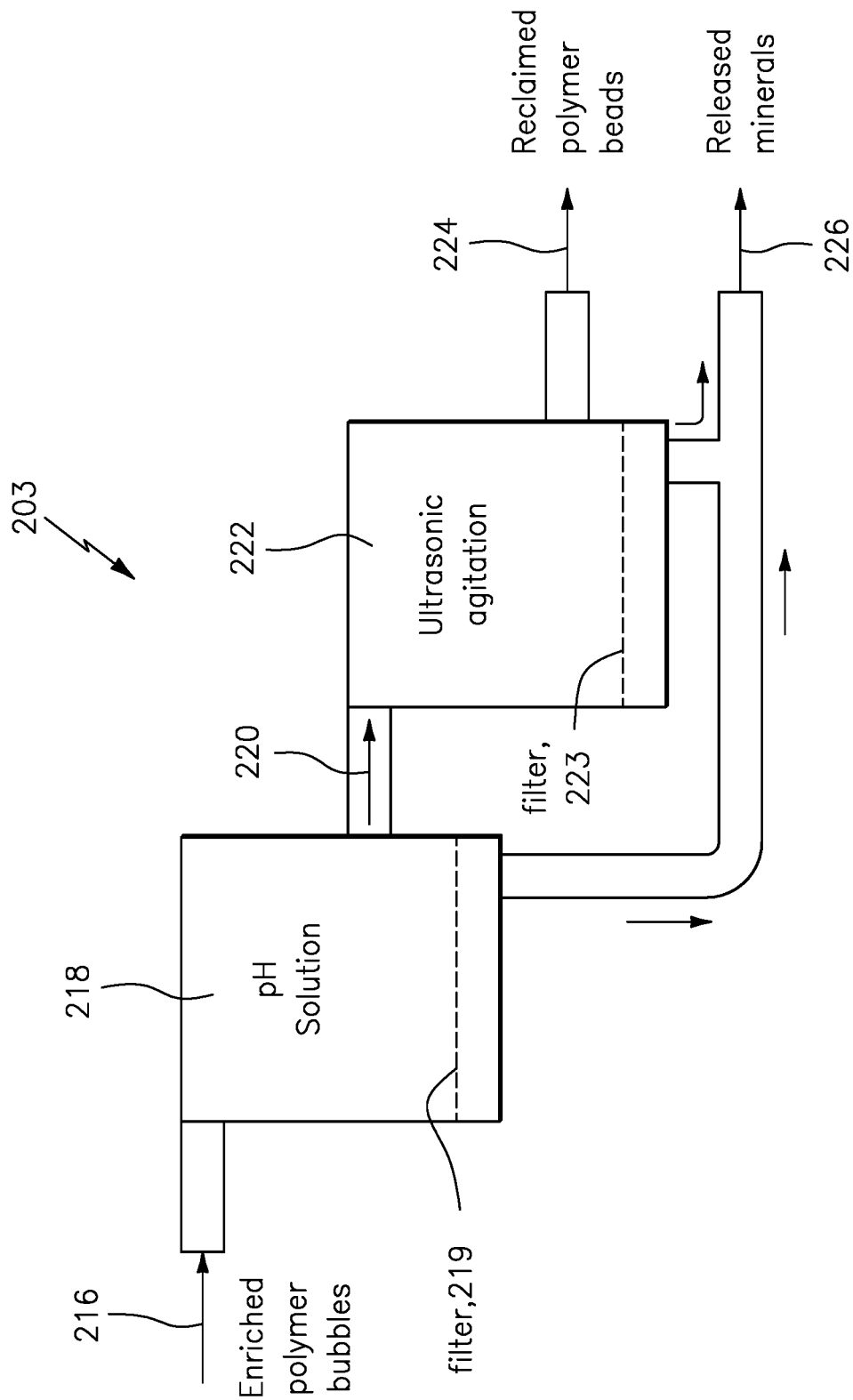
FIG. 11 is a diagram of a bead recovery processor in which the valuable material is removed from the polymer bubbles or beads in two or more stages, according to some embodiments of the present invention.

More than one of the methods for releasing the valuable material from the enriched synthetic bubbles or beads can be used in the same bead recovery process or processor at the same time. For example, while the enriched synthetic bubbles or beads 18 are subjected to ultrasonic agitation (see FIG. 7), the reclaimed water can also be heated by a water heater, such as a heater 150 as depicted in FIG. 6. Furthermore, an acidic solution can be also added to the water to lower the pH in the flotation column 54. In a different embodiment of the present invention, same or different releasing methods are used sequentially in different stages. By way of example, the enriched polymer bubbles 216 from the separation apparatus 200 (see FIG. 2) can be processed in a multi-state processor 203 as shown in FIG. 11. The apparatus 200 has a first recovery processor 218 where an acidic solution is used to release the valuable material at least partially from the enriched polymer bubbles 216. A filter 219 is used to separate the released mineral 226 from the polymer bubbles 220. At a second recovery processor 222, an ultrasound source is used to apply ultrasonic agitation to the polymer bubbles 220 in order to release the remaining valuable material, if any, from the polymer bubbles. A filter 223 is used to separate the released mineral 226 from the reclaimed polymer bubbles 224. It is understood that more than two processing stages can be carried out and different combinations of releasing methods are possible.

FIG. 12: Horizontal Pipeline

According to some embodiments of the present invention, the separation process can be carried out in a horizontal pipeline as shown in FIG. 12. As shown in FIG. 12, the synthetic bubbles or beads 308 may be used in, or form part of, a size-based separation process using countercurrent flows with mixing implemented in apparatus such as a horizontal pipeline generally indicated as 300. In FIG. 12, the horizontal pipeline 310 is configured with a screen 311 to separate the enriched synthetic bubbles or beads 302 having the valuable material attached thereto from the mixture based at least partly on the difference in size. The horizontal pipeline 310 may be configured to separate the enriched synthetic bubbles or beads 302 having the valuable material attached thereto from the mixture using countercurrent flows with mixing, so as to receive in the horizontal pipeline 310 slurry 304 flowing in a first direction A, receive in the horizontal pipeline 300 synthetic bubbles or beads 308 flowing in a second direction B opposite to the first direction A, provide from the horizontal pipeline 308 the enriched synthetic bubbles or beads 302 having the valuable material attached thereto and flowing in the second direction B, and provide from the horizontal pipeline 310 waste or tailings 306 that is separated from the mixture using the screen 311 and flowing in the second direction B. In a horizontal pipeline 310, it is not necessary that the synthetic beads or bubbles 308 be lighter than the slurry 304. The density of the synthetic beads or bubbles 308 can be substantially equal to the density of the slurry 304 so that the synthetic beads or bubbles can be in a suspension state while they are mixed with slurry 304 in the horizontal pipeline 310.

Figure 13B:
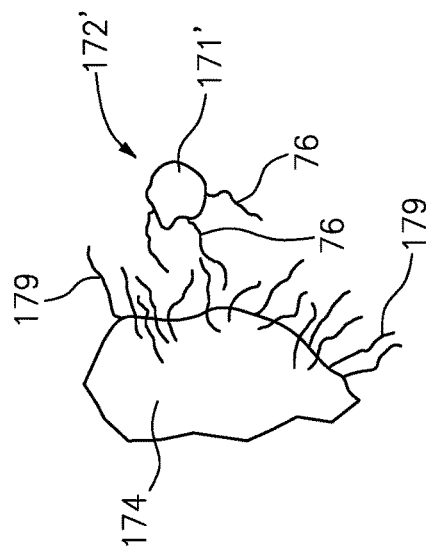
FIG. 13b illustrates an enlarged portion of the hydrophobic synthetic bead showing a wetted mineral particle attaching the hydrophobic surface of the synthetic bead.
Figure 13C:
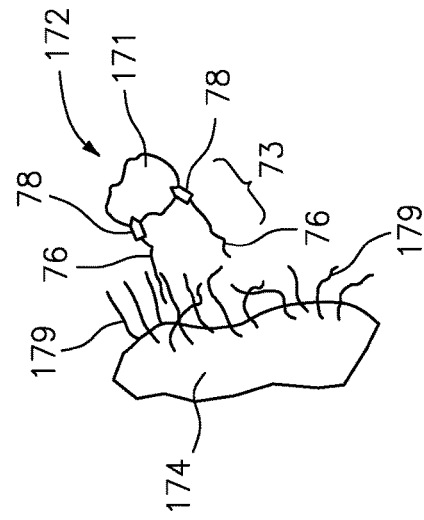
FIG. 13c illustrates an enlarged portion of the hydrophobic synthetic bead showing a hydrophobic non-mineral particle attaching the hydrophobic surface of the synthetic bead.
Figure 13A:
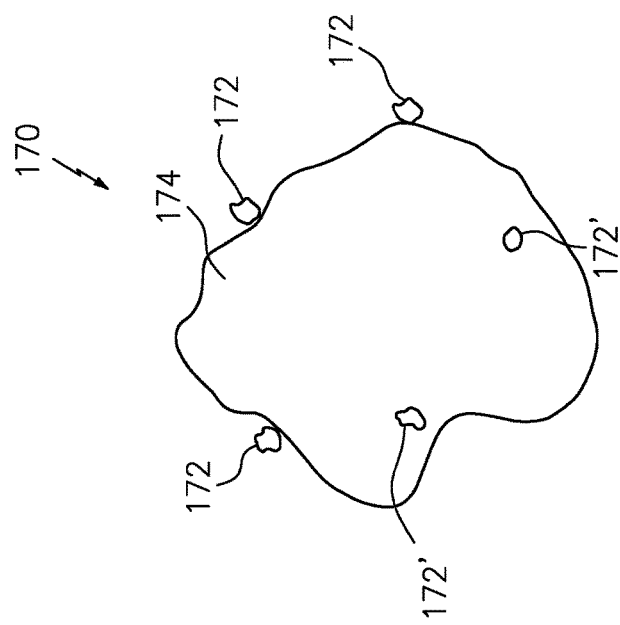
FIG. 13a shows a generalized synthetic bead functionalized to be hydrophobic, wherein the bead can be a size-based bead or bubble, weight-based polymer bead and bubble, and magnetic-based bead and bubble, according to some embodiments of the present invention.

It should be understood that the sized-based bead or bubble, weight-based bead or bubble, magnetic-based bead or bubble as described in conjunction with FIGS. 3a-5d can be functionalized to be hydrophobic so as to attract mineral particles. FIG. 13a shows a generalized hydrophobic synthetic bead, FIG. 13b shows an enlarged portion of the bead surface and a mineral particle, and FIG. 13b shows an enlarged portion of the bead surface and a non-mineral particle. As shown in FIG. 13a the hydrophobic synthetic bead 170 has a polymer surface 174 and a plurality of particles 172, 172' attached to the polymer surface 174. FIG. 13b shows an enlarged portion of the polymer surface 174 on which a plurality of molecules 179 rendering the polymer surface 174 hydrophobic.

A mineral particle 171 in the slurry, after combined with one or more collector molecules 73, becomes a wetted mineral particle 172. The collector molecule 73 has a functional group 78 attached to the mineral particle 171 and a hydrophobic end or molecular segment 76. The hydrophobic end or molecular segment 76 is attracted to the hydrophobic molecules 179 on the polymer surface 174. FIG. 13c shows an enlarged portion of the polymer surface 174 with a plurality of hydrophobic molecules 179 for attracting a non-mineral particle 172'. The non-mineral particle 172' has a particle body 171' with one or more hydrophobic molecular segments 76 attached thereto. The hydrophobic end or molecular segment 76 is attracted to the hydrophobic molecules 179 on the polymer surface 174. The term "polymer" in this specification means a large molecule made of many units of the same or similar structure linked together. Furthermore, the polymer associated with FIGS. 13a-13c can be naturally hydrophobic or functionalized to be hydrophobic. Some polymers having a long hydrocarbon chain or silicon-oxygen backbone, for example, tend to be hydrophobic. Hydrophobic polymers include polystyrene, poly(d,l-lactide), poly(dimethylsiloxane), polypropylene, polyacrylic, polyethylene, etc. The bubbles or beads, such as synthetic bead 170 can be made of glass to be coated with hydrophobic silicone polymer including polysiloxanates so that the bubbles or beads become hydrophobic. The bubbles or beads can be made of metal to be coated with silicone alkyd copolymer, for example, so as to render the bubbles or beads hydrophobic. The bubbles or beads can be made of ceramic to be coated with fluoroalkylsilane, for example, so as to render the bubbles and beads hydrophobic. The bubbles or beads can be made of hydrophobic polymers, such as polystyrene and polypropylene to provide a hydrophobic surface. The wetted mineral particles attached to the hydrophobic synthetic bubble or beads can be released thermally, ultrasonically, electromagnetically, mechanically or in a low pH environment.

Figure 14B:
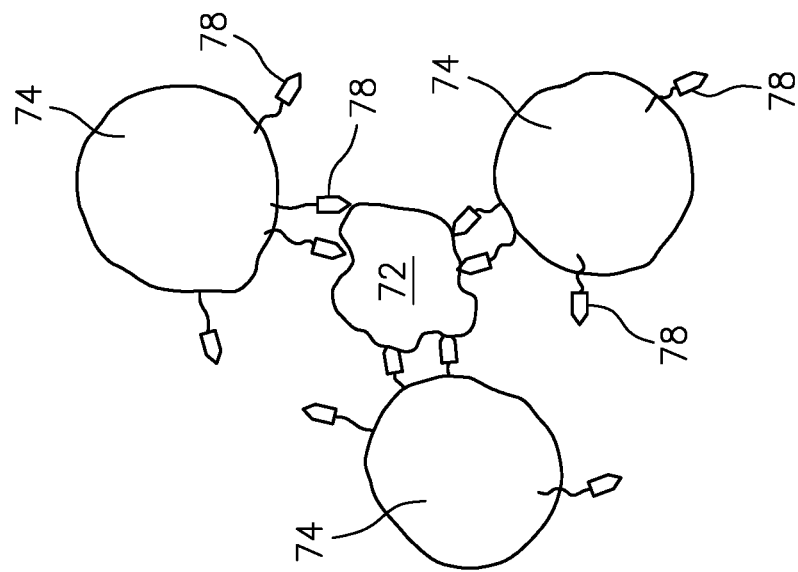
FIG. 14b illustrates a mineral particle being attached to a number of slightly larger synthetic beads at the same time.
Figure 14A:
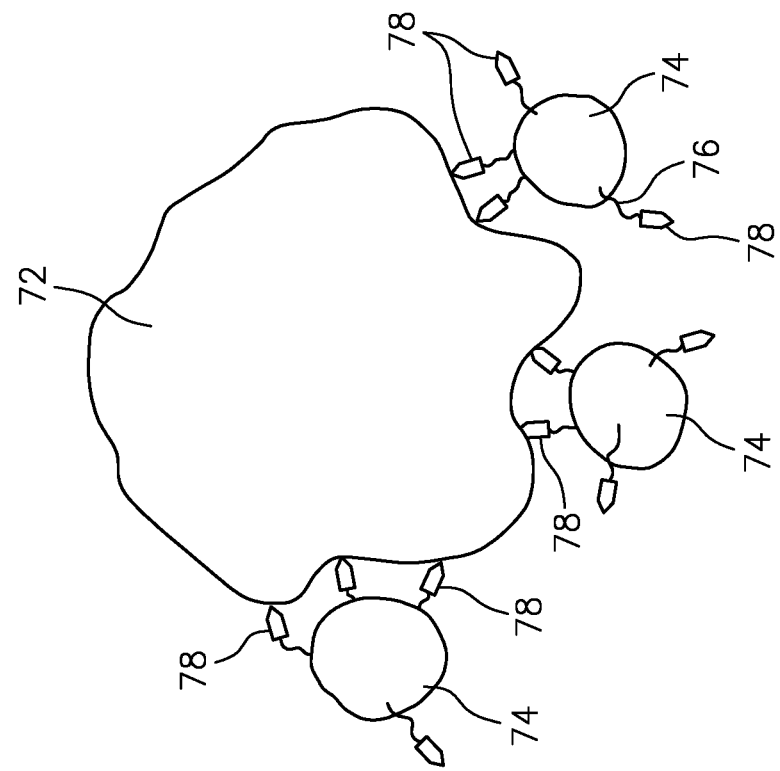
FIG. 14a illustrates a mineral particle being attached to a number of much smaller synthetic beads at the same time.

FIG. 14a illustrates a scenario where a mineral particle 72 is attached to a number of synthetic beads 74 at the same time. Thus, although the synthetic beads 74 are much smaller in size than the mineral particle 72, a number of synthetic beads 74 may be able to lift the mineral particle 72 upward in a flotation cell. Likewise, a smaller mineral particle 72 can also be lifted upward by a number of synthetic beads 74 as shown in FIG. 14b. In order to increase the likelihood for this "cooperative" lifting to occur, a large number of synthetic beads 74 can be mixed into the slurry. Unlike air bubbles, the density of the synthetic beads can be chosen such that the synthetic beads may stay along in the slurry before they rise to surface in a flotation cell.

Figure 15B:
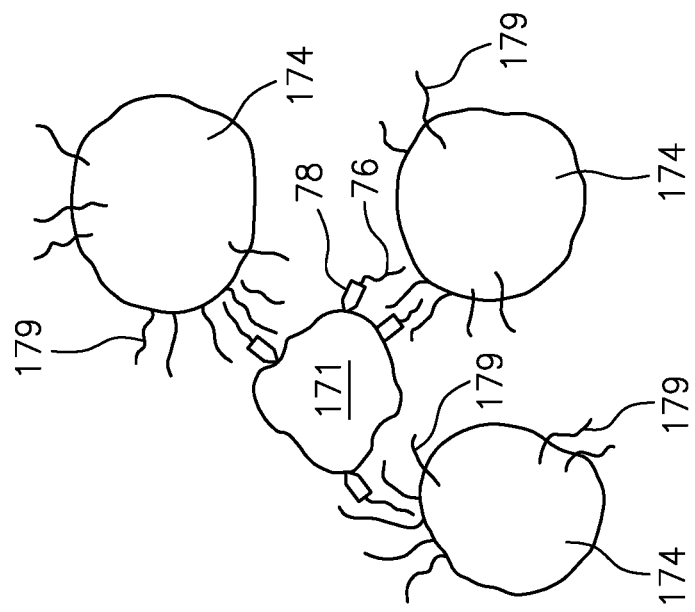
FIG. 15b illustrates a wetted mineral particle being attached to a number of slightly larger hydrophobic synthetic beads at the same time.
Figure 15A:
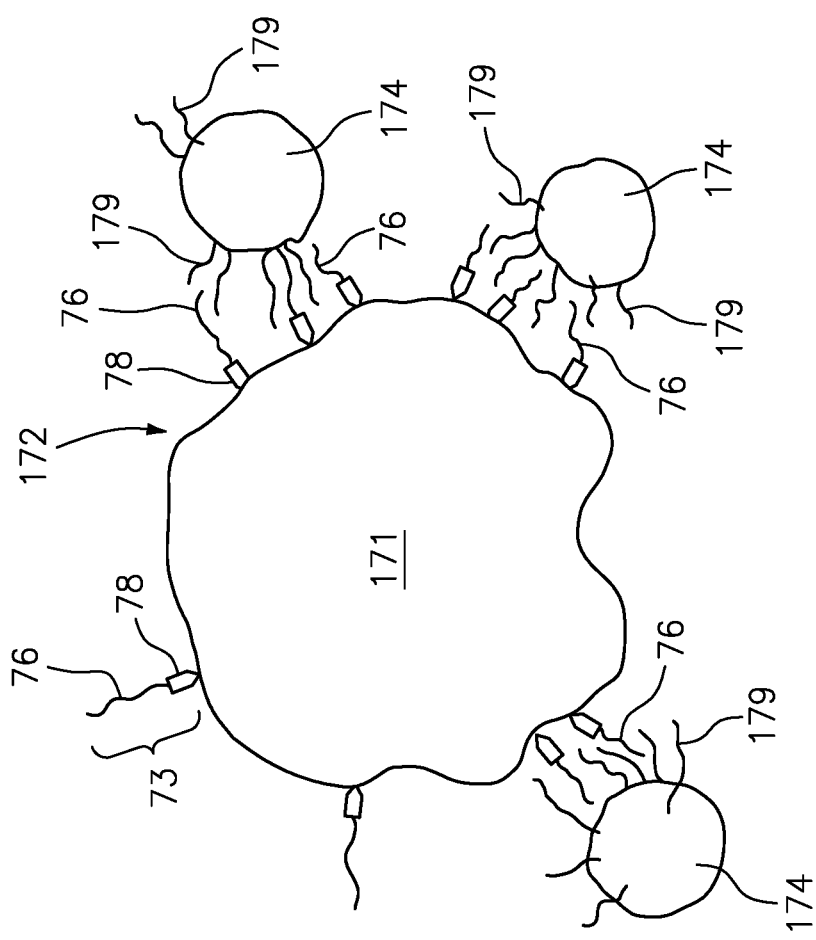
FIG. 15a illustrates a wetted mineral particle being attached to a number of much smaller hydrophobic synthetic beads at the same time.

FIGS. 15a and 15b illustrate a similar scenario. As shown, a wetted mineral particle 172 is attached to a number of hydrophobic synthetic beads 174 at the same time.

According to some embodiments of the present invention, only a portion of the surface of the synthetic bead is functionalized to be hydrophobic. This has the benefits as follows:

1. Keeps too many beads from clumping together—or limits the clumping of beads,
2. Once a mineral is attached, the weight of the mineral is likely to force the bead to rotate, allowing the bead to be located under the bead as it rises through the flotation cell;
   a. Better cleaning as it may let the gangue to pass through
   b. Protects the attached mineral particle or particles from being knocked off, and
   c. Provides clearer rise to the top collection zone in the flotation cell.

According to some embodiments of the present invention, only a portion of the surface of the synthetic bead is functionalized with collectors. This also has the benefits of 1. Once a mineral is attached, the weight of the mineral is likely to force the bead to rotate, allowing the bead to be located under the bead as it rises through the flotation cell;
   a. Better cleaning as it may let the gangue to pass through
   b. Protects the attached mineral particle or particles from being knocked off, and
   c. Provides clearer rise to the top collection zone in the flotation cell.

Figure 16A:
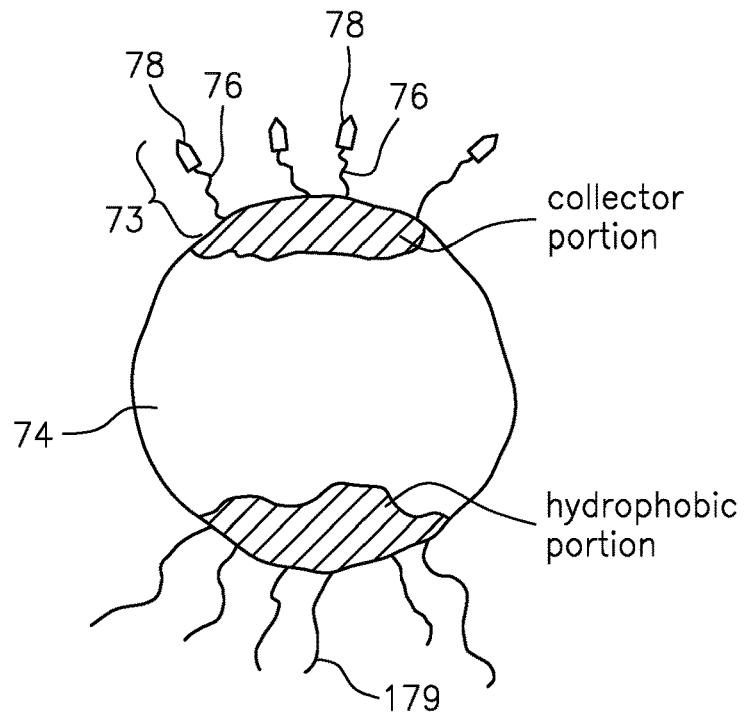
FIGS. 16a and 16b illustrate some embodiments of the present invention wherein the synthetic bead or bubble have one portion functionalized to have collector molecules and another portion functionalized to be hydrophobic.
Figure 16B:
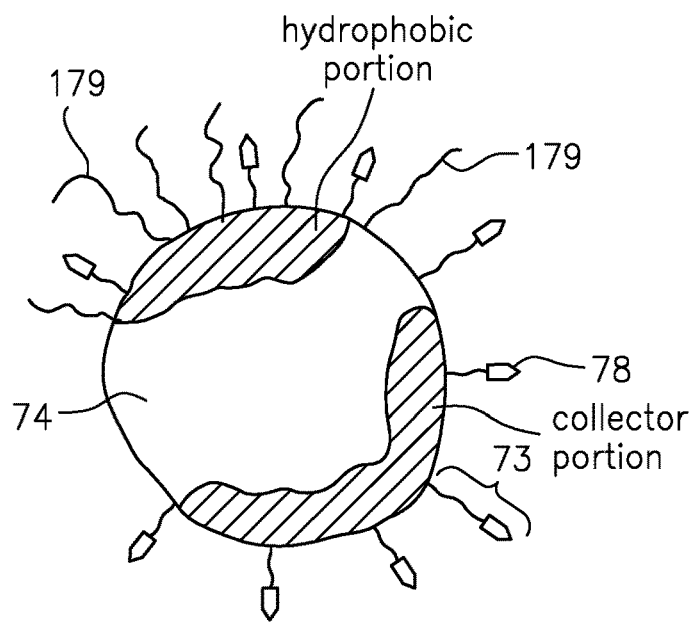

According to some embodiments of the present invention, one part of the synthetic bead is functionalized with collectors while another part of same synthetic bead is functionalized to be hydrophobic as shown in FIGS. 16a and 16b. As shown in Figure xxa, a synthetic bead 74 has a surface portion where polymer is functionalized to have collector molecules 73 with functional group 78 and molecular segment 76 attached to the surface of the bead 74. The synthetic bead 74 also has a different surface portion where polymer is functionalized to have hydrophobic molecules 179. In the embodiment as shown in FIG. 16b, the entire surface of the synthetic bead 74 can be functionalized to have collector molecules 73, but a portion of the surface is functionalized to have hydrophobic molecules 179 render it hydrophobic.

This "hybrid" synthetic bead can collect mineral particles that are wet and not wet.

Applications

The scope of the invention is described in relation to mineral separation, including the separation of copper from ore. It should be understood that the synthetic beads according to the present invention, whether functionalized to have a collector or functionalized to be hydrophobic, are also configured for use in oilsands separation—to separate bitumen from sand and water in the recovery of bitumen in an oilsands mining operation. Likewise, the functionalized filters and membranes, according to some embodiments of the present invention, are also configured for oilsands separation.

According to some embodiments of the present invention, the surface of a synthetic bead can be functionalized to have a collector molecule. The collector has a functional group with an ion capable of forming a chemical bond with a mineral particle. A mineral particle associated with one or more collector molecules is referred to as a wetted mineral particle. According to some embodiments of the present invention, the synthetic bead can be functionalized to be hydrophobic in order to collect one or more wetted mineral particles.

The scope of the invention is intended to include other types or kinds of applications either now known or later developed in the future, e.g., including a flotation circuit, leaching, smelting, a gravity circuit, a magnetic circuit, or water pollution control.

THE SCOPE OF THE INVENTION

It should be further appreciated that any of the features, characteristics, alternatives or modifications described regarding a particular embodiment herein may also be applied, used, or incorporated with any other embodiment described herein. In addition, it is contemplated that, while the embodiments described herein are useful for homogeneous flows, the embodiments described herein can also be used for dispersive flows having dispersive properties (e.g., stratified flow). Although the invention has been described and illustrated with respect to exemplary embodiments thereof, the foregoing and various other additions and omissions may be made therein and thereto without departing from the spirit and scope of the present invention.

What is claimed is:

1. An apparatus comprising:
a plurality of synthetic beads carrying mineral particles, wherein each of the synthetic beads has a body made of a synthetic material, the body comprising a surface and a plurality of molecules attached to the surface, the molecules comprising a functional group having a chemical bond for attracting one or more of the mineral particles to the molecules, causing the mineral particles to attach to synthetic beads, wherein the surface comprises a coating attached thereto to provide the plurality of molecules, the coating comprising a hydrophobic chemical selected from a group consisting of polysiloxanates, poly(dimethylsiloxane) and fluoroalkylsilane; and
releasing apparatus configured to interrupt the chemical bond of the functional group so as to remove the mineral particles from the synthetic beads, wherein the synthetic material comprises polymer or polymer-based materials, and wherein the polymer is selected from the group consisting of polyamides (nylon), polyesters, polyurethanes, phenol-formaldehyde, urea-formaldehyde, melamine-formaldehyde, polyacetal, polyethylene, polyisobutylene, polyacrylonitrile, poly (vinyl chloride), polystyrene, poly(methyl methacrylates), poly(vinyl acetate), poly(vinylidene chloride), polyisoprene, polybutadiene, polyacrylates, poly(carbonate) and phenolic resin.

2. The apparatus according to claim 1, wherein the synthetic beads carrying the mineral particles are received in a mixture having a first temperature, wherein said release apparatus is configured to cause the synthetic beads carrying the mineral particles to contact with a medium having a second temperature higher than the first temperature.

3. The apparatus according to claim 1, wherein the synthetic beads carrying the mineral particles are caused to contact with a liquid, and wherein said release apparatus is configured to apply a sonic agitation to the liquid for causing the mineral particles to separate from the synthetic beads.

4. The apparatus according to claim 3, wherein said release apparatus is an ultrasonic source configured to provide apply the sonic agitation to the liquid.

5. The apparatus according to claim 4, wherein the ultrasonic source is configured to produce ultrasound in the range of 10 Hz to 10 MHz for the sonic agitation.

6. The apparatus according to claim 4, wherein the synthetic beads comprise a resonant frequency, and wherein the ultrasonic source is configured to produce an ultrasonic frequency substantially equal to the resonant frequency.

7. The apparatus according to claim 1, wherein the synthetic beads carrying the mineral particles are received along with a mixture having a first pH value, wherein said release apparatus is configured to cause the synthetic beads carrying the mineral particles to contact with a medium having a second pH value different from the first pH value.

8. The apparatus according to claim 7 wherein the second pH value ranges from 0 to 7.

9. The apparatus according to claim 1, wherein the synthetic beads carrying the mineral particles are caused to contact with a liquid, and wherein said release apparatus is configured to apply microwaves to the liquid for causing the mineral particles to separate from the synthetic beads.

10. The apparatus according to claim 1, wherein said release apparatus is configured to mechanically cause the synthetic beads to move against each other.

11. The apparatus according to claim 10, wherein said release apparatus is configured to stir the synthetic beads.

12. The apparatus according to claim 10, wherein part of the synthetic beads carrying the mineral particles is made of a magnetic material, and said release apparatus is a magnetic stirrer configured to stir the synthetic beads.

13. The apparatus according to claim 1, wherein the synthetic beads carrying the mineral particles are received along with a mixture, wherein said release apparatus is configured to perform two or more interruption techniques, including: 1) to lower pH value of the mixture, 2) to apply an ultrasound to the mixture; 3) to increase the temperature of the mixture and 4) to mechanically stir the mixture.

14. The apparatus according to claim 13, wherein said release apparatus is configured to perform the two or more interruption techniques on the mixture concurrently or sequentially.

15. The apparatus according to claim 1, wherein the mixture has a pH value, said apparatus further comprising:
a controller arranged to release an acidic material for changing the pH value of the mixture.

16. The apparatus according to claim 15, wherein the acidic material has a pH value of 0 to 6.

17. The apparatus according to 1, wherein the synthetic beads carrying the mineral particles are received in a mixture having a temperature, said apparatus further comprises a heater arranged to raise the temperature of the mixture.

18. An apparatus comprising:
a plurality of synthetic beads carrying mineral particles, wherein each of the synthetic beads has a body made of a synthetic material, the body comprising a surface and a plurality of molecules attached to the surface, the molecules comprising a functional group having a chemical bond for attracting one or more of the mineral particles to the molecules, causing the mineral particles to attach to synthetic beads, wherein the surface comprises a coating attached thereto to provide the plurality of molecules, the coating comprising a hydrophobic chemical selected from a group consisting of polysiloxanates, poly(dimethylsiloxane) and fluoroalkylsilane; and
releasing apparatus configured to interrupt the chemical bond of the functional group so as to remove the mineral particles from the synthetic beads, wherein the synthetic material comprises silica or silica-based materials, or glass or glass-based materials.

* * * * *